United States Patent
Jidai et al.

(10) Patent No.: US 10,564,334 B2
(45) Date of Patent: Feb. 18, 2020

(54) SPECTRAL FILTER AND SPECTROMETRIC DEVICE

(71) Applicant: Konica Minolta, Inc., Tokyo (JP)

(72) Inventors: Hidetaka Jidai, Koganei (JP); Munenori Kawaji, Tokyo (JP); Ryoji Matsuda, Kunitachi (JP)

(73) Assignee: KONICA MINOLTA, INC., Tokyo (JP)

( * ) Notice: Subject to any disclaimer, the term of this patent is extended or adjusted under 35 U.S.C. 154(b) by 198 days.

(21) Appl. No.: 15/559,908

(22) PCT Filed: Mar. 28, 2016

(86) PCT No.: PCT/JP2016/059902
§ 371 (c)(1),
(2) Date: Sep. 20, 2017

(87) PCT Pub. No.: WO2016/158853
PCT Pub. Date: Oct. 6, 2016

(65) Prior Publication Data
US 2018/0095207 A1 Apr. 5, 2018

(30) Foreign Application Priority Data
Apr. 3, 2015 (JP) .................. 2015-076654

(51) Int. Cl.
*G02B 27/00* (2006.01)
*G02B 5/28* (2006.01)
(Continued)

(52) U.S. Cl.
CPC .................. *G02B 5/28* (2013.01); *G01J 3/26* (2013.01); *G01J 3/28* (2013.01); *G01J 3/36* (2013.01)

(58) Field of Classification Search
CPC .......... G01J 3/02; G01J 3/0256; G01J 3/0259; G01J 3/12; G01J 3/26; G01J 3/28;
(Continued)

(56) References Cited

U.S. PATENT DOCUMENTS 5,128,798 A * 7/1992 Bowen .................. G02B 5/284
356/519

FOREIGN PATENT DOCUMENTS

JP     H02132405 A       5/1990
JP     2009294316 A  *  12/2009

OTHER PUBLICATIONS

International Search Report dated Jun. 28, 2016 for PCT/JP2016/059902.

* cited by examiner

*Primary Examiner* — Mustak Choudhury
(74) *Attorney, Agent, or Firm* — Lucas & Mercanti, LLP

(57) ABSTRACT

A spectral filter (10) is provided with a long-pass filter (12) and a short-pass filter (13). The long-pass filter (12) has a film thickness gradient GL wherein film thickness increases monotonically in a single direction, and transmits light of a wavelength region longer than a cut-off wavelength WL. The short-pass filter (13) has a film thickness gradient GS wherein film thickness increases monotonically in a single direction, and transmits light of a wavelength region shorter than a cut-off wavelength WS. The long-pass filter (12) and the short-pass filter (13) are overlapped such that the single directions match each other. At the positions in the single directions, a transmittance peak is formed by the cut-off wavelength WL being shorter than the cut-off wavelength WS. The film thickness gradient GL is greater than the film thickness gradient GS.

8 Claims, 16 Drawing Sheets

(51) Int. Cl.
*G01J 3/36* (2006.01)
*G01J 3/26* (2006.01)
*G01J 3/28* (2006.01)

(58) Field of Classification Search
CPC .... G01J 3/36; G01J 3/51; G01J 3/1256; G01J 5/60; G01J 5/602; G01J 2003/262; G01J 2005/604; G02B 6/12; G02B 6/122; G02B 6/12007; G02B 6/1228; G02B 6/29358; G02B 6/29389; G02B 6/2938; G02B 5/28; G02B 5/284; G02B 5/288
USPC ....... 359/260, 298, 308, 359, 519, 577, 722, 359/885, 890; 356/320, 416, 419, 454; 250/226
See application file for complete search history.

SPECTRAL FILTER AND SPECTROMETRIC DEVICE

CROSS REFERENCE TO RELATED APPLICATION

This Application is a 371 of PCT/JP2016/059902 filed on Mar. 28, 2016, which, in turn, claimed the priority of Japanese Patent Application No. JP 2015-076654 filed on Apr. 3, 2015, both applications are incorporated herein by reference.

TECHNICAL FIELD

The present invention relates to a spectral filter of which the transmission wavelength varies continuously in one direction, and to a spectrometric device incorporating such a spectral filter.

BACKGROUND ART

One example of conventional spectral filters is disclosed in Patent Document 1 identified below. The spectral filter of Patent Document 1 includes a first interference filter and a second interference filter. The first interference filter, of which the cutoff wavelength WL lengthens monotonically in one direction, transmits light in a wavelength range longer than the cutoff wavelength WL. The second interference filter, of which the cutoff wavelength WS lengthens monotonically in one direction, transmits light in a wavelength range shorter than the cutoff wavelength WS. An interference filter of which the cutoff wavelength varies monotonically in one direction as just mentioned can be configured as a so-called wedge-form interference filter of which the film thickness increases continuously in one direction. In Patent Document 1, the first and second interference filters are given equal film thickness gradients.

The first and second interference filters are laid over each other such that the directions in which the cutoff wavelengths WL and WS increase monotonically coincide and in addition that the cutoff wavelength WL of the first interference filter is shorter than the cutoff wavelength WS of the second interference filter at any mutually corresponding positions. With this configuration, at any position in the one direction, the cutoff characteristic on each of the longer- and shorter-wavelength sides of the peak wavelength of the spectral transmittance can be set with a separate interference filter. It is thus possible to easily obtain spectral characteristics superior to those obtained with a single interference filter.

LIST OF CITATIONS

Patent Literature

Patent Document 1: Japanese Patent Application published as No. H2-132405 (see the claims, workings, examples, FIGS. 1 to 3, etc.)

SUMMARY OF THE INVENTION

Technical Problem

Materials used in the films that constitute interference filters inevitably exhibit so-called wavelength dispersion; that is, their refractive index varies with wavelength. Specifically, the refractive index of a film material increases as the wavelength shortens, and decreases as the wavelength lengthens. In particular, a high-refractive-index material exhibits large wavelength dispersion in the wavelength range of visible light (its refractive index varies greatly with varying wavelengths).

Thus, when the first and second interference filters having equal film thickness gradients are laid over each other, under the influence of wavelength dispersion in film materials, in the wavelength range on the shorter-wavelength side of visible light, the cutoff wavelength WL of the first interference filter shifts to the longer-wavelength side, and the cutoff wavelength WS of the second interference filter shifts to the shorter-wavelength side. Likewise, in the wavelength range on the longer-wavelength side of visible light, the cutoff wavelength WL of the first interference filter shifts to the shorter-wavelength side, and the cutoff wavelength WS of the second interference filter shifts to the longer-wavelength side. As a result, in the wavelength range on the shorter-wavelength side of visible light, the transmittance has a narrower half-maximum width (full wavelength width at half maximum); in contrast, in the wavelength range on the longer-wavelength side of visible light, the transmittance has a wider half-maximum width. With a large difference in the half-maximum width between on the shorter- and longer-wavelength sides of visible light, when the spectral filter is combined with photoreceptive elements to perform spectrometry, it exhibits greatly different resolutions between on the shorter- and longer-wavelength sides of incident light, which is undesirable.

Devised to solve the problems mentioned above, the present invention aims to provide, as a spectral filter of which the transmission wavelength varies monotonically in one direction in which the film thickness varies, a spectral filter that offers such spectral characteristics that the half-maximum width of the transmittance is generally uniform over the entire wavelength range of visible light, and to provide a spectrometric device incorporating such a spectral filter.

Means for Solving the Problem

According to one aspect of the present invention, a spectral filter includes: a long-pass filter having a film thickness gradient GL such that the film thickness increases monotonically in one direction, the long-pass filter transmitting light in a wavelength range longer than a cutoff wavelength WL, the cutoff wavelength WL lengthening monotonically as the film thickness increases; and a short-pass filter having a film thickness gradient GS such that the film thickness increases monotonically in one direction, the short-pass filter transmitting light in a wavelength range shorter than a cutoff wavelength WS, the cutoff wavelength WS lengthening monotonically as the film thickness increases. Here, the long-pass filter and the short-pass filter are laid over each other so as to coincide in the one direction in which the film thickness increases monotonically. Moreover, at any position in the one direction, the cutoff wavelength WL is shorter than the cutoff wavelength WS so as to form a peak in transmittance. Moreover, the film thickness gradient GL is larger than the film thickness gradient GS.

According to another aspect of the present invention, a spectrometric device includes: a spectral filter configured as described above; and a plurality of photoreceptive elements which receive light transmitted through the spectral filter. Here, the photoreceptive elements are arranged along the one direction in which the film thickness increases monotonically in the long-pass and short-pass filters.

Advantageous Effects of the Invention

With the configuration described above, owing to the film thickness gradient GL of the long-pass filter being larger than the film thickness gradient GS of the short-pass filter, even under the influence of wavelength dispersion in the film materials, it is possible, in the shorter-wavelength side of visible light, to shift the cutoff wavelength WL of the long-pass filter to the shorter-wavelength side and the cutoff wavelength WS of the short-pass filter to the longer-wavelength side and, in the longer-wavelength side of visible light, to shift the cutoff wavelength WL of the long-pass filter to the longer-wavelength side and the cutoff wavelength WS of the short-pass filter to the shorter-wavelength side. It is thus possible to obtain spectral characteristics such that the half-maximum width of the transmittance is generally uniform over the entire wavelength range of visible light.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DESCRIPTION OF EMBODIMENTS

Embodiments of the present invention will be described below with reference to the accompanying drawings. In the present description, any range of values from "a" to "b" is supposed to include the lower limit value "a" and the upper limit value "b". The scope of the present invention is not limited by what is disclosed herein. In the present description, any half-maximum width is supposed to be a full width at half maximum.

(Structure of a Spectrometric Device)

Figure 1:
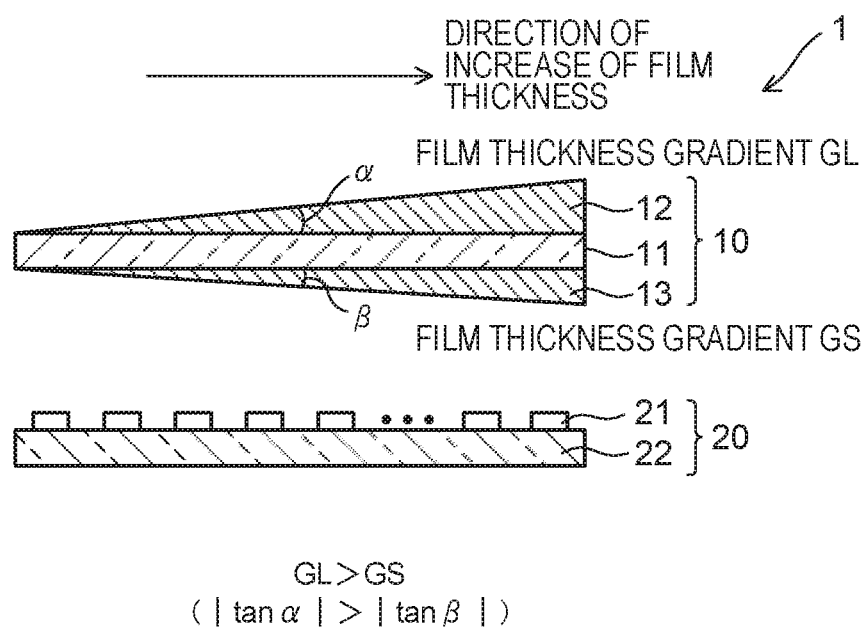
FIG. 1 is a sectional view showing an outline of the structure of a spectrometric device according to one embodiment of the present invention.

FIG. 1 is a sectional view showing an outline of the structure of a spectrometric device 1 according to one embodiment of the present invention. The spectrometric device 1 includes a spectral filter 10 and a photoreceptor 20. The spectral filter 10 is a band-pass filter of which the transmission wavelength varies continuously in one direction (an LVF, i.e., a linear variable filter), and includes a substrate 11, a long-pass filter 12, and a short-pass filter 13. The substrate 11 is a transparent substrate, and is formed of, for example, glass.

The long-pass filter 12 has a film thickness gradient GL such that the film thickness increases monotonically in one direction. When the angle between the surface of the substrate 11 and the outermost surface of the long-pass filter 12 is represented by α(°), the film thickness gradient GL equals |tan α|. The long-pass filter 12 is configured as a multi-layer film in which layers of a first-refractive-index material (low-refractive-index material) and layers of at least one second-refractive-index material (high-refractive-index material) with a higher refractive index than that of the first-refractive-index material are stacked together, and transmits light in a wavelength range longer than a cutoff wavelength WL. The cutoff wavelength WL is the wavelength at which the transmittance is 50%, and lengthens monotonically (shifts to the longer wavelength side) as the film thickness increases in the above-mentioned one direction.

The short-pass filter 13 has a film thickness gradient GS such that the film thickness increases monotonically in one direction. When the angle between the surface of the substrate 11 and the outermost surface of the short-pass filter 13 is represented by $\beta(°)$, the film thickness gradient GS equals $|\tan \beta|$. The short-pass filter 13 is configured as a multi-layer film in which layers of a first-refractive-index material (low-refractive-index material) and layers of at least one second-refractive-index material (high-refractive-index material) with a higher refractive index than that of the first-refractive-index material are stacked together, and transmits light in a wavelength range shorter than a cutoff wavelength WS. The multi-layer films of the short-pass and long-pass filters 13 and 12 are configured differently (in terms of, for example, the number of layers and the thickness of the individual layers). The cutoff wavelength WS is the wavelength at which the transmittance is 50%, and lengthens monotonically (shifts to the longer wavelength side) as the film thickness increases.

Figure 3:
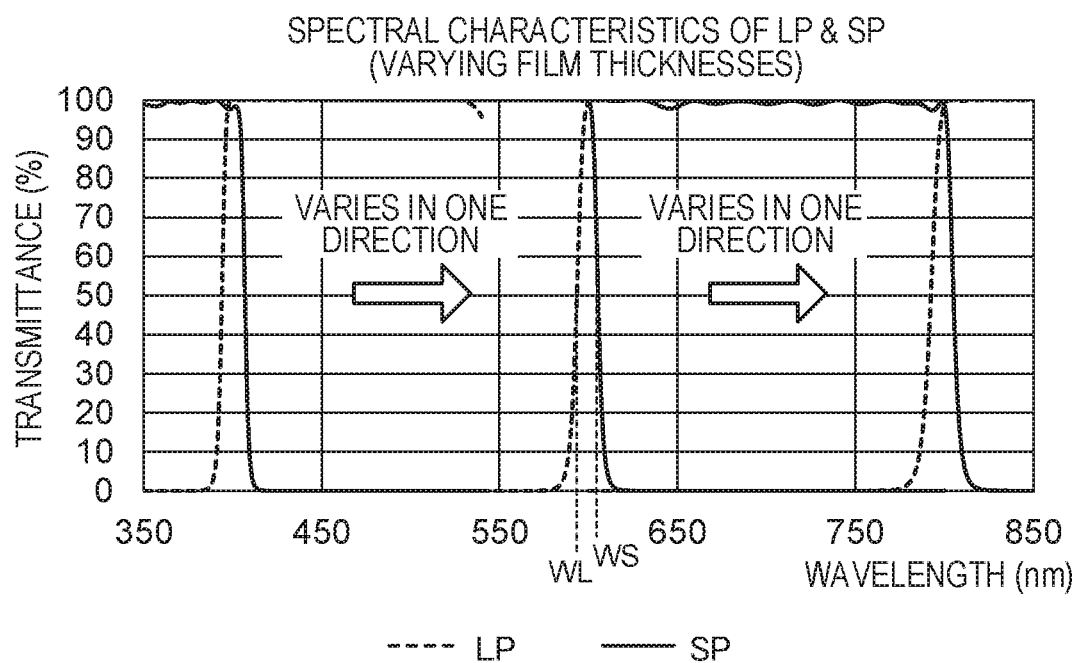
FIG. 3 is a graph showing the spectral characteristics of a long-pass filter and a short-pass filter each with a film thickness that varies in one direction.

As shown in FIG. 1, the long-pass and short-pass filters 12 and 13 are laid over each other such that, between them, the above-mentioned one direction in which the film thickness increases monotonically coincides. At any position in the above-mentioned one direction in which the film thickness increases monotonically, the cutoff wavelength WL is shorter than the cutoff wavelength WS, and this produces a peak of transmittance (see FIG. 3, etc.). That is, at any position in the above-mentioned direction, the transmittance peaks at a wavelength longer than the cutoff wavelength WL but shorter than the cutoff wavelength WS. As mentioned above, the cutoff wavelengths WL and WS shift to the longer wavelength side as the film thickness increases, and accordingly the wavelength at which the transmittance peaks (the peak wavelength) shifts to the longer wavelength side as the film thickness increases. This means that, in the above-mentioned one direction in which the film thickness increases, the wavelength of the light that is transmitted through the spectral filter 10 (that is, the transmission wavelength range) varies continuously.

The photoreceptor 20 includes a plurality of photoreceptive elements 21 and a support substrate 22 which supports the photoreceptive elements 21. The photoreceptive elements 21, of which each is a sensor that receives the light transmitted through the spectral filter 10, are arranged on the support substrate 22 in a row along the above-mentioned one direction in which the film thickness increases monotonically in the long-pass and short-pass filters 12 and 13. In the spectral filter 10, since the transmission wavelength varies continuously in the one direction, it is possible, by detecting which of the plurality of photoreceptive elements 21 arranged along the one direction receives light, to know the wavelength (wavelength range) of the light that is incident on the spectral filter 10.

Although in FIG. 1, the photoreceptor 20 is arranged so as to receive the light transmitted through the long-pass and short-pass filters 12 and 13 in this order, it may instead be arranged so as to receive the light transmitted through the short-pass and long-pass filters 13 and 12 in this order.

(Relationship Between the Film Thickness Gradients)

In this embodiment, a configuration is adopted where the film thickness gradient GL of the long-pass filter 12 is larger than the film thickness gradient GS of the short-pass filter 13 (that is, $|\tan \alpha| > |\tan \beta|$), so that the half-maximum width of the transmittance is generally uniform over the entire wavelength range of visible light. How this effect results will now be described.

Figure 2:
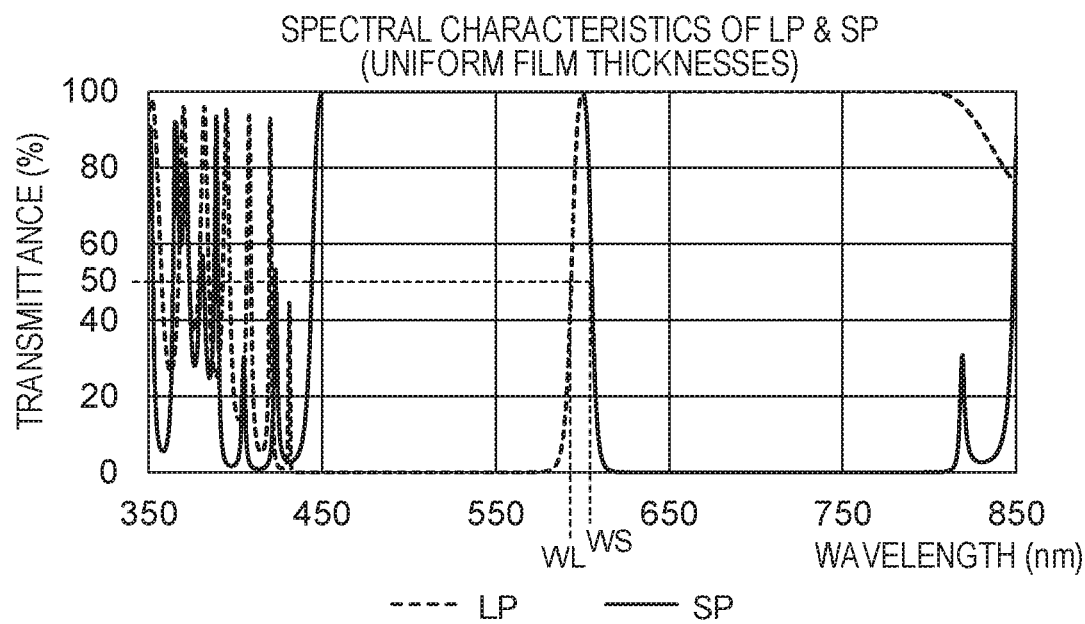
FIG. 2 is a graph showing the spectral characteristics of a long-pass filter and a short-pass filter each with a uniform film thickness.

FIG. 2 is a graph showing the spectral characteristics of a common long-pass filter (LP) and a common short-pass filter (SP) each with a uniform film thickness. A band-pass filter (BP) that transmits light in a predetermined wavelength range is built by laying together an LP and an SP such that their respective cutoff wavelengths WL and WS are deviated from each other (such that WL<WS). By depositing the LP and the SP such that the film thickness varies (for example, increases) in one direction, and then laying them together, it is possible to build a BP of which the transmission wavelength varies in the one direction in which the film thickness varies, that is, of which the transmission wavelength varies from position to position as the film thickness varies.

Figure 4:
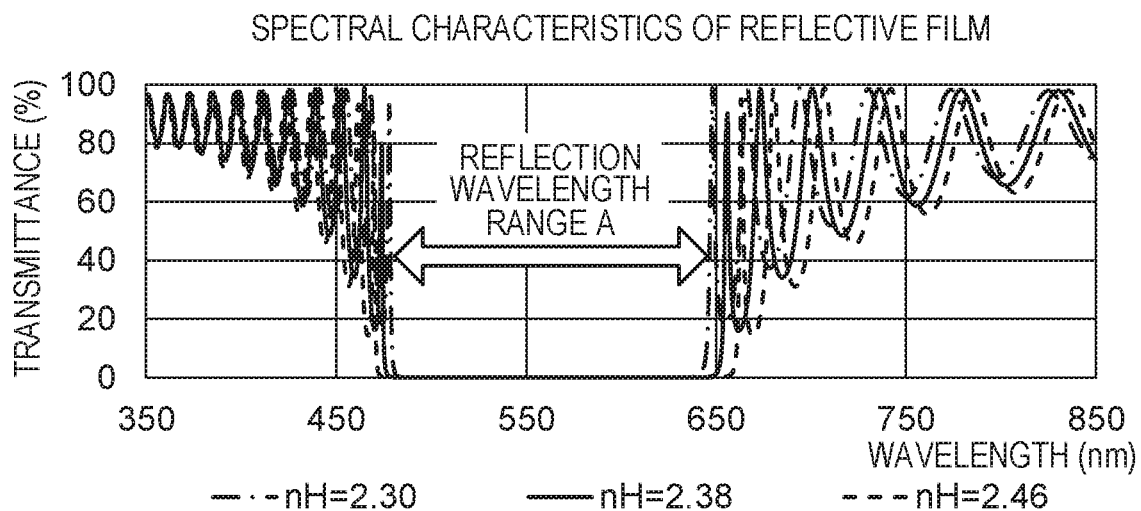
FIG. 4 is a graph showing how, in a reflective film, the spectral characteristics vary as the refractive index of a high-refractive-index material is varied.

FIG. 4 shows how, in a common reflective film configured as a multi-layer film of high- and low-refractive-index materials, the spectral characteristics vary as the refractive index nH of the high-refractive-index is varied among 2.30, 2.38, and 2.46. It is known that, as shown there, the reflection wavelength range A of the reflective film widens as the refractive index nH of the high-refractive-index increases and narrows as the refractive index nH decreases.

Figure 5:
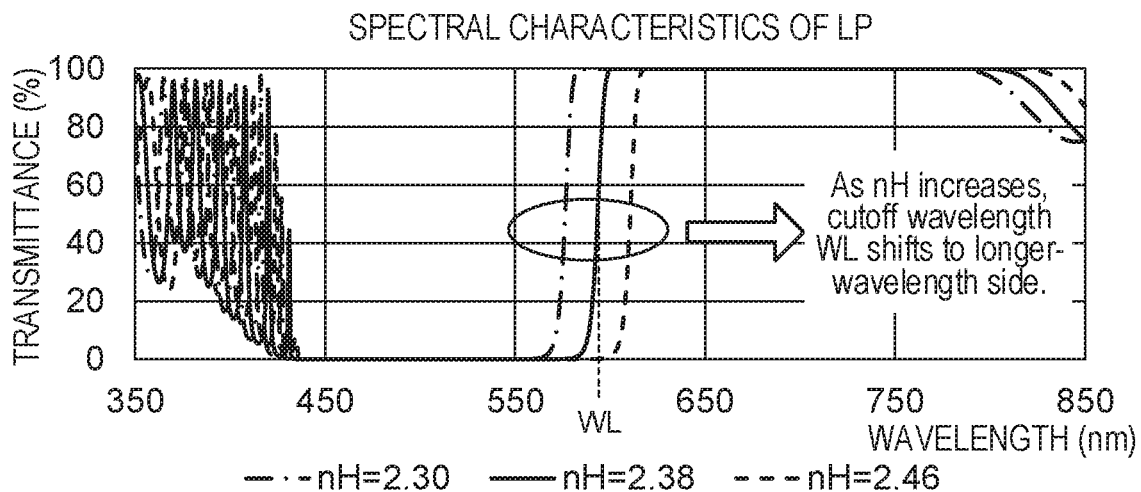
FIG. 5 is a graph showing how, in the above long-pass filter, the spectral characteristics vary as the refractive index of a high-refractive-index material is varied.
Figure 6:
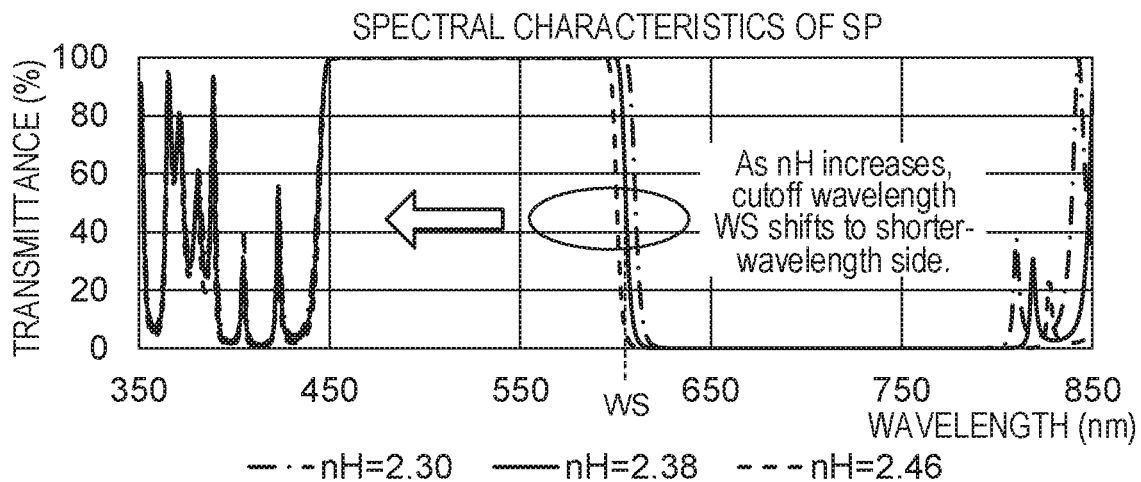
FIG. 6 is a graph showing how, in the above short-pass filter, the spectral characteristics vary as the refractive index of a high-refractive-index material is varied.

Such variation of spectral characteristics in a reflective film can be considered in the context of an LP and an SP each configured as a multi-layer film of high- and low-refractive-index materials: the spectral characteristics in the longer-wavelength side of the reflection wavelength range A of the reflective film (especially the spectral characteristics in the wavelength range where the transmittance rises sharply from 0%) correspond to the spectral characteristics of the LP (especially the spectral characteristics around the cutoff wavelength WL where the transmittance rises sharply from 0%), and the spectral characteristics in the shorter-wavelength side of the reflection wavelength range A (especially the spectral characteristics in the wavelength range where the transmittance falls sharply to 0%) correspond to the spectral characteristics of the SP (especially the spectral characteristics around the cutoff wavelength WS where the transmittance falls sharply to 0%). Accordingly, in the LP, as shown in FIG. 5, as the refractive index nH of the high-refractive-index material increases, the cutoff wavelength WL shifts to the longer-wavelength side, and in the SP, as shown in FIG. 6, as the refractive index nH of the high-refractive-index material increases, the cutoff wavelength WS shifts to the shorter-wavelength side. In contrast, as the refractive index nH of the high-refractive-index material decreases, in the LP, the cutoff wavelength WL shifts to the shorter-wavelength side, and in the SP, the cutoff wavelength WS shifts to the longer wavelength side.

Figure 7:
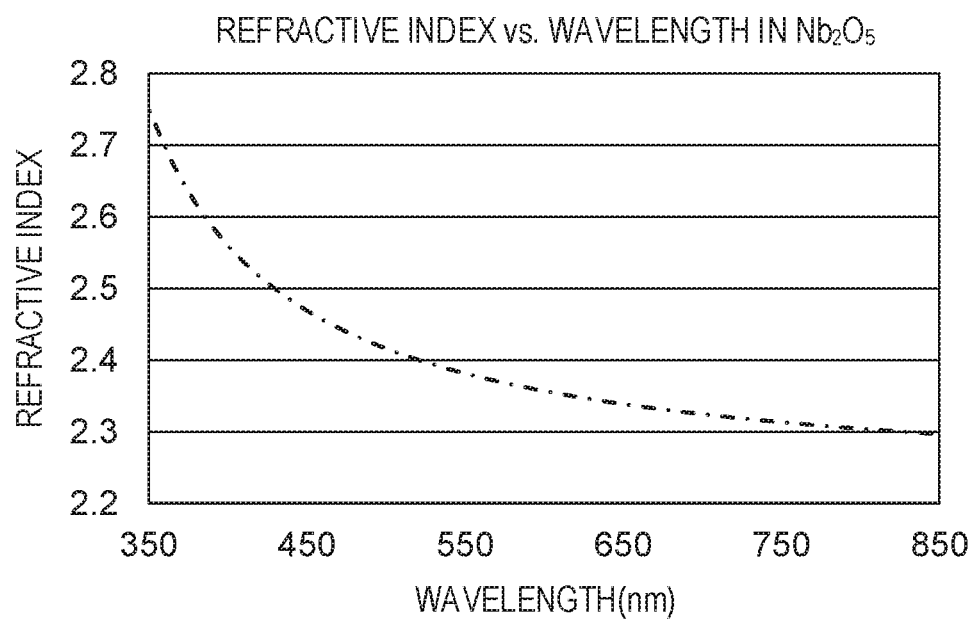
FIG. 7 is a graph showing the relationship between wavelength and refractive index in niobium oxide.
Figure 8:
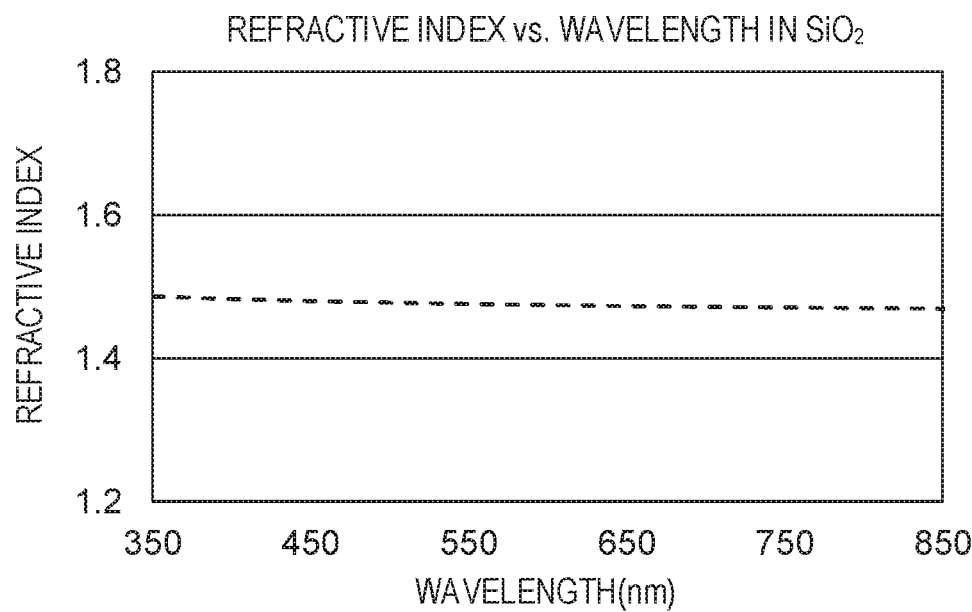
FIG. 8 is a graph showing the relationship between wavelength and refractive index in silicon oxide.

FIG. 7 shows the relationship between wavelength and refractive index in niobium oxide ($Nb_2O_5$), which is an example of a high-refractive-index material. FIG. 8 shows the relationship between wavelength and refractive index in silicon oxide ($SiO_2$), which is an example of a low-refractive-index material. Any material used in a film has a wavelength dispersion such that, the shorter the wavelength, the higher the refractive index. It is seen that this tendency is more notable in a high-refractive-index material than in a low-refractive-index material. That is, the wavelength dispersion in a low-refractive-index material is negligibly small compared with that in a high-refractive-index material.

Figure 9:
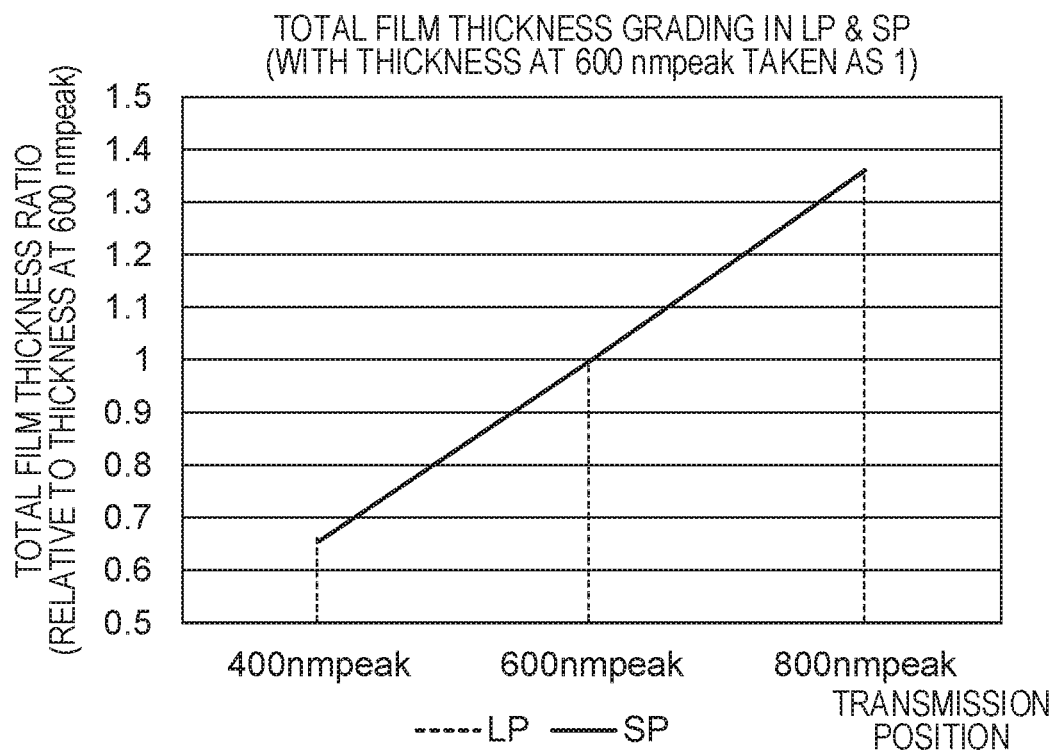
FIG. 9 is a graph showing how the total film thickness is graded in a long-pass filter and a short-pass filter with equal film thickness gradients.
Figure 10:
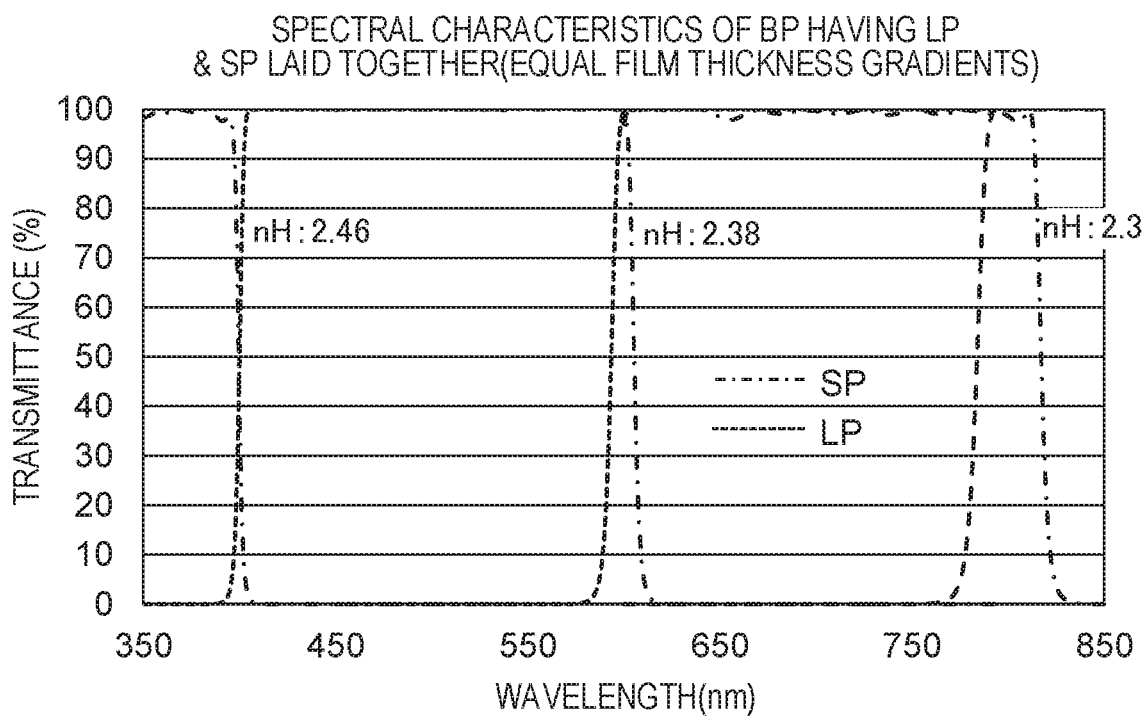
FIG. 10 is a graph showing one example of the spectral characteristics of a band-pass filter built by laying together the above long-pass filter and the above short-pass filter.

FIG. 9 shows how the total film thickness is graded in an LP and an SP each with a film thickness gradient. In the diagram, for both the LP and the SP, the total film thickness at the position where the transmittance peaks at a wavelength of 600 nm (that is, at the 600 nm peak position) is taken as the reference (total film thickness 1), and the ratio of the total film thickness at different positions to that total film thickness is shown. When an LP and an SP with equal film thickness gradients as shown in FIG. 9, that is, an LP and an SP in which the total film thickness is varied at equal rates in one direction, are laid over each other to build a BP, then, as shown in FIG. 10, in the wavelength range on the shorter-wavelength side of a given reference (a wavelength of 600 nm) (for example, around a wavelength of 380 nm), under the influence of the above-mentioned wavelength dispersion of the high-refractive-index material (due to the increase in the refractive index nH), the cutoff wavelength WL of the LP shifts to the longer-wavelength side and the cutoff wavelength WS of the SP shifts to the shorter-wavelength side. This results in a narrower half-maximum width around a wavelength of 380 nm. In contrast, in the wavelength range on the longer-wavelength side of the given reference (a wavelength of 600 nm) (for example, around a wavelength of 780 nm), under the wavelength dispersion of the high-refractive-index material (due to the decrease in the refractive index nH), the cutoff wavelength WL of the LP shifts to the shorter-wavelength side and the cutoff wavelength WS of the SP shifts to the longer-wavelength side. This results in a wider half-maximum width around a wavelength of 780 nm.

Figure 11:
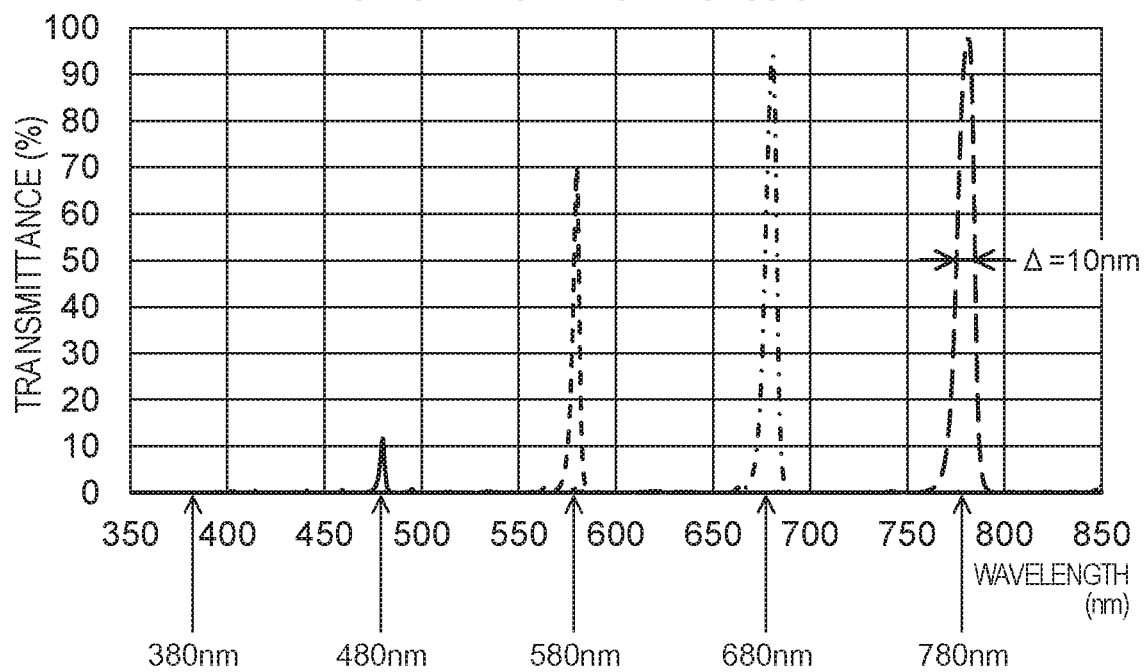
FIG. 11 is a graph showing another example of the spectral characteristics of the above band-pass filter.
Figure 24:
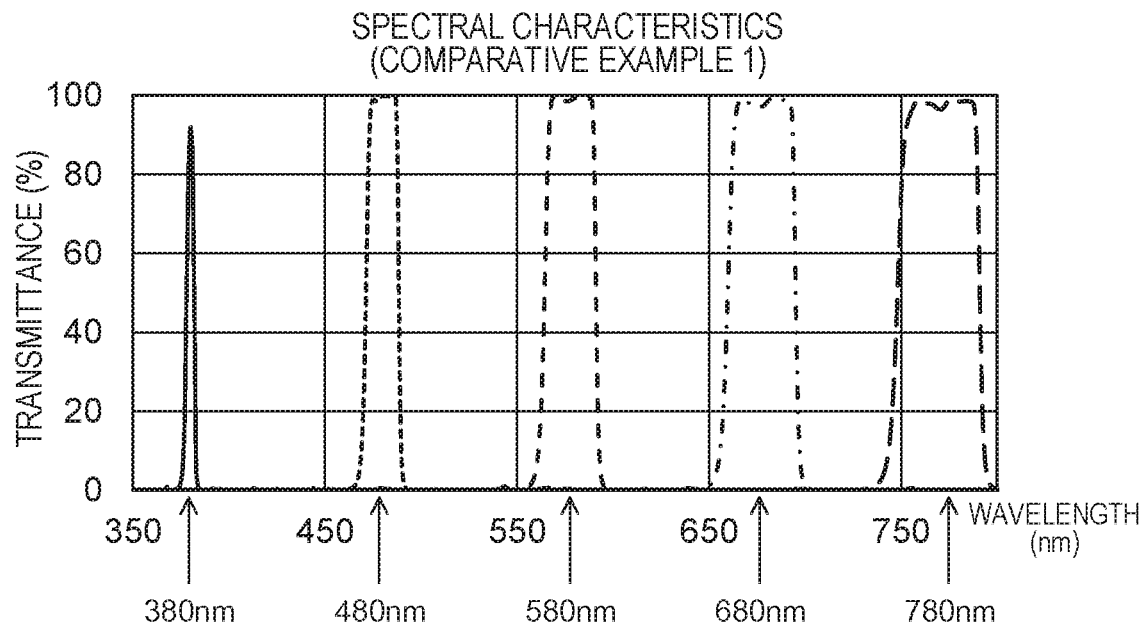
FIG. 24 is a graph showing the spectral characteristics of the spectral filter of Comparative Example 1.

Thus, when the LP and the SP are deposited and laid over each other such that, for example, a half-maximum width of 4 nm is obtained around a wavelength of 380 nm, the half-maximum width around a wavelength of 780 nm is 40 nm or more (see Comparative Example 1 and FIG. 24, which will be described later). In contrast, when the LP and the SP are deposited and laid over each other such that, for example, a half-maximum width $\Delta$ of 10 nm is obtained around a wavelength of 780 nm, then, as shown in FIG. 11, the spectral characteristics do not exhibit a half-maximum width around a wavelength of 380 nm, preventing transmission of light around a wavelength of 380 nm.

Figure 12:
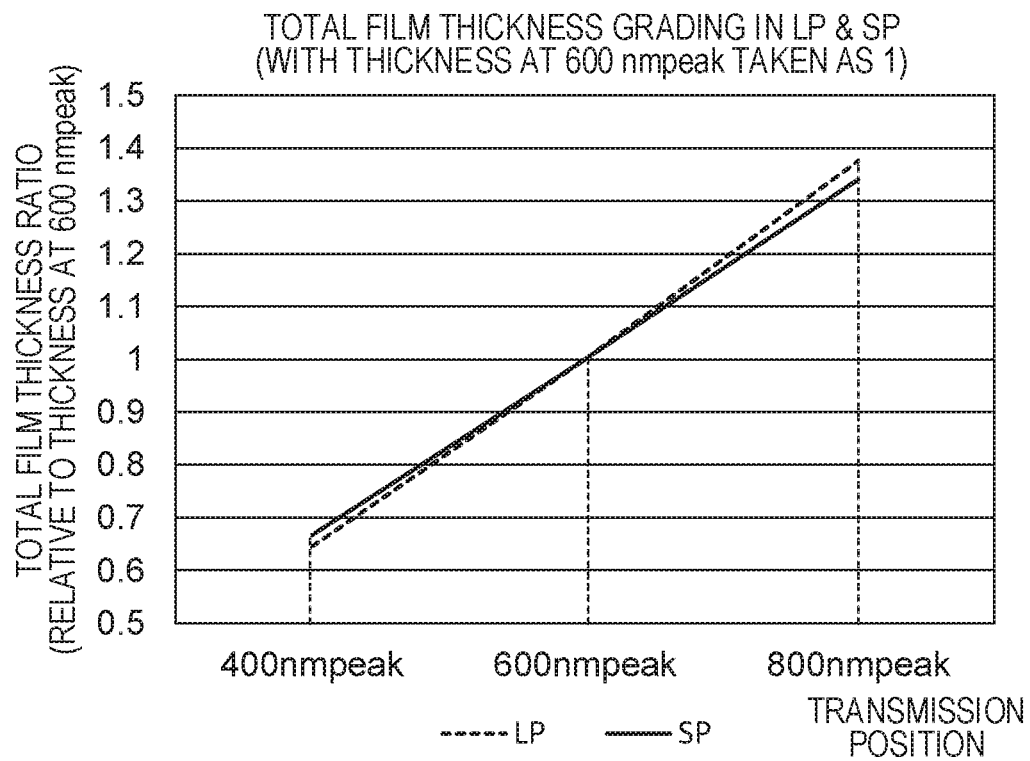
FIG. 12 is a graph showing how the total film thickness is graded in a long-pass filter and a short-pass filter with different film thickness gradients.
Figure 13:
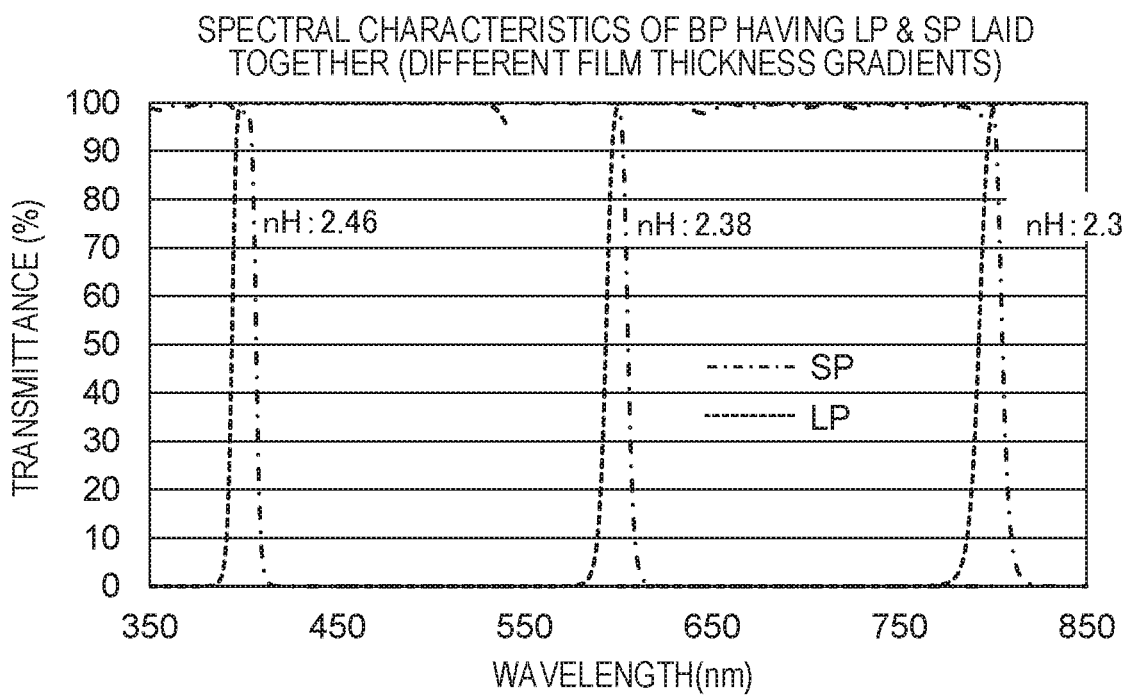
FIG. 13 is a graph showing one example of the spectral characteristics of a band-pass filter built by laying together the above long-pass filter and the above short-pass filter.

On the other hand, FIG. 12 how the total film thickness is graded in an LP and an SP when the LP is given a larger film thickness gradient than that of the SP. In FIG. 12, as in FIG. 9, for both the LP and the SP, the total film thickness at the position where the transmittance peaks at a wavelength of 600 nm is taken as the reference (total film thickness 1), and the ratio of the total film thickness at different positions to that total film thickness is shown. When an LP with a relatively large film thickness gradient and an SP with a relatively small film thickness gradient are laid over each other to build a BP, then, as in FIG. 12, on the wavelength range on the shorter-wavelength side of a given reference (a wavelength of 600 nm) (for example, around a wavelength of 380 nm), the degree of decrease of the total film thickness relative to the reference film thickness (the total film thickness at a wavelength of 600 nm) is higher in the LP than in the SP. Accordingly, around a wavelength of 380 nm, even still under the influence of the above-mentioned wavelength dispersion of the high-refractive-index material, it is possible, for the LP, to shift the cutoff wavelength WL in the direction in which the total film thickness decreases and, for the SP, to shift the cutoff wavelength WS in the direction in which the total film thickness increases. That is, as shown in FIG. 13, around a wavelength of 380 nm, it is possible to shift the cutoff wavelength WL to the shorter-wavelength side from the position shown in FIG. 10 and to shift the cutoff wavelength WS to the longer-wavelength side from the position shown in FIG. 10.

Figure 14:
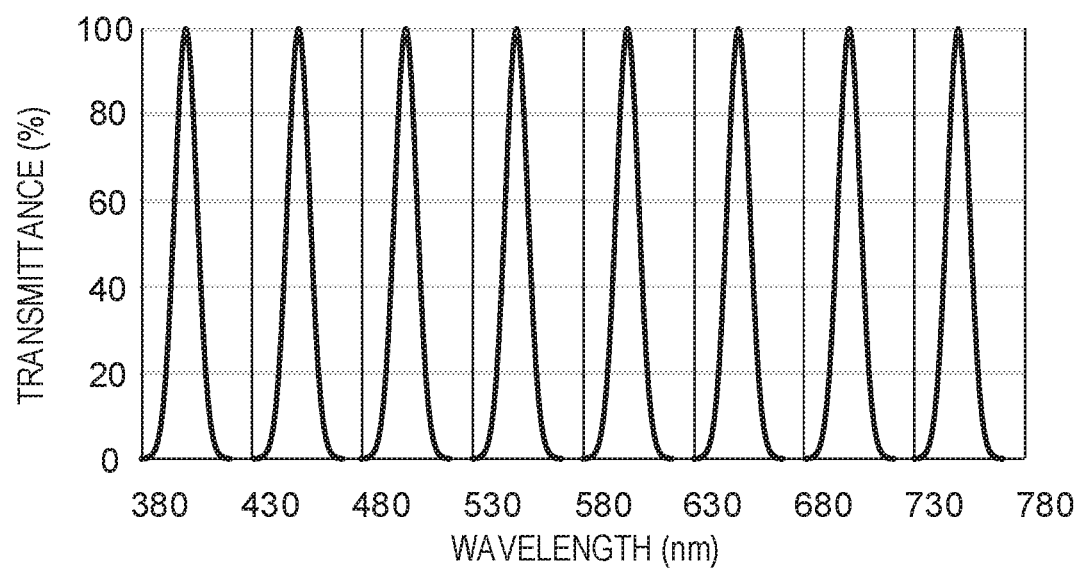
FIG. 14 is a graph showing another example of the spectral characteristics of the above band-pass filter.

In contrast, in the wavelength range on the longer-wavelength side of a given reference (a wavelength of 600 nm), the degree of increase of the total film thickness relative to the reference film thickness (the total film thickness at a wavelength of 600 nm) is higher in the LP than in the SP. Accordingly, around a wavelength of 780 nm, even still under the influence of the above-mentioned wavelength dispersion of the high-refractive-index material, it is possible, for the LP, to shift the cutoff wavelength WL in the direction in which the total film thickness increases and, for the SP, to shift the cutoff wavelength WS in the direction in which the total film thickness decreases. That is, as shown in FIG. 13, around a wavelength of 780 nm, it is possible to shift the cutoff wavelength WL to the longer-wavelength side from the position shown in FIG. 10 and to shift the cutoff wavelength WS to the shorter-wavelength side from the position shown in FIG. 10. In this way, as shown in FIG. 14, it is possible to make the half-maximum width generally uniform over the entire wavelength range of visible light.

(Preferred Range of the Half-Maximum Width)

In the spectral filter 10 described above, when the half-maximum width of the transmittance at a wavelength of 380 nm is represented by $\Delta\lambda_{380}$ (nm), the half-maximum width of the transmittance at a wavelength of 780 nm is represented by $\Delta\lambda_{780}$ (nm), and $\Delta\lambda_{380}/\Delta\lambda_{780}$ is represented by $\Delta\lambda$, then it is preferable to fulfill $$0.3 \leq \Delta\lambda \leq 4, \quad (A)$$

and it is further preferable to fulfill $$0.4 \leq \Delta\lambda \leq 2. \quad (B)$$

One criterion to judge that the half-maximum width is generally uniform over the entire wavelength range of visible light is that the half-maximum width exhibits a small difference between on the shorter- and longer-wavelength sides of the wavelength range of visible light. When conditional formula (A) above is fulfilled, it can be said that the half-maximum width exhibits a small difference between on the shorter- and longer-wavelength sides of the wavelength range of visible light, and this is considered to make it possible to obtain a spectral filter 10 in which the half-maximum width is generally uniform over the entire wavelength range of visible light.

In particular, when conditional formula (B) is fulfilled, the value of $\Delta\lambda$ is definitely closer to 1; accordingly it can be said that the half-maximum width exhibits a definitely small difference between on the shorter- and longer-wavelength sides of the wavelength range of visible light, and this is considered to make it possible to obtain a spectral filter 10 in which the half-maximum width is more uniform over the entire wavelength range of visible light.

(Specific Conditions for Fulfilling Conditional Formulae (A) and (B))

Next, specific conditions for fulfilling conditional formulae (A) and (B) will be explored.

As mentioned above, the long-pass and short-pass filters 12 and 13 in the spectral filter 10 are each configured as a multi-layer film in which layers of a first-refractive-index material and layers of at least one second-refractive-index material with a refractive index higher than that of the first-reflective-index material are stacked together. Here, among the at least one second-refractive-index material, the material with at least either the largest number of layers or the largest total film thickness is taken as the main-refractive-index material. In a case where only one kind of second-refractive-index material is used, this second-refractive-index material is the main-refractive-index material. In a case where the second-refractive-index material with the largest number of layers differs from the second-refractive-index material with the largest total film thickness, either can be taken as the main-refractive-index material.

In the long-pass filter 12, the refractive index of the main-refractive-index at a wavelength of 380 nm and the refractive index of the main-refractive-index at a wavelength of 780 nm are represented by $nL_{380}$ and $nL_{780}$, respectively, the film thickness of the transmissive portion that has a peak of transmittance at a wavelength of 780 nm is represented by $dL_{780}$ (nm), and the film thickness of the transmissive portion that has a peak of transmittance at a wavelength of 380 nm is represented by $dL_{380}$ (nm). On the other hand, in the short-pass filter 13, the refractive index of the main-refractive-index at a wavelength of 380 nm and the refractive index of the main-refractive-index at a wavelength of 780 nm are represented by $nS_{380}$ and $nS_{780}$ respectively, the film thickness of the transmissive portion that has a peak of transmittance at a wavelength of 780 nm is represented by $dS_{780}$ (nm), and the film thickness of the transmissive portion that has a peak of transmittance at a wavelength of 380 nm is represented by $dS_{380}$ (nm).

It is preferable that the spectral filter 10 fulfill conditional formula (1) below.

$$0.99 \leq \{(dL_{780}/dL_{380})/(dS_{780}/dS_{380})\} \times [\{(nL_{780}/nL_{380})+(nS_{780}/nS_{380})\} \times \tfrac{1}{2}]^{0.4} \leq 1.065 \quad (1)$$

Substituting $$(dL_{780}/dL_{380})/(dS_{780}/dS_{380}) = E$$

$$[\{(nL_{780}/nL_{380})+(nS_{780}/nS_{380})\} \times \tfrac{1}{2}]^{0.4} = M$$

$$E \times M = F$$

in conditional formula (1) allows one to simplify it into conditional formula (1') below.

$$0.99 \leq F \leq 1.065 \quad (1')$$

It is further preferable that the spectral filter 10 fulfill conditional formula (2) below.

$$0.995 \leq \{(dL_{780}/dL_{380})/(dS_{780}/dS_{380})\} \times [\{(nL_{780}/nL_{380})+(nS_{780}/nS_{380})\} \times \tfrac{1}{2}]^{0.4} \leq 1.03 \quad (2)$$

In a similar manner as with conditional formula (1') above, conditional formula (2) can be simplified into conditional formula (2') below.

$$0.995 \leq F \leq 1.03 \quad (2')$$

Here, the quantity E above is the ratio of the film thickness gradient GL of the long-pass filter 12 to the film thickness gradient GS of the short-pass filter 13. The farther $dL_{780}/dL_{380}$ is larger than $dS_{780}/dS_{380}$, that is, the farther the film thickness gradient GL is larger than the film thickness gradient GS, the larger the value of E.

On the other hand, the quantity M above is the average value of the dispersions of the main-refractive-index material used in the long-pass filter 12 and of the main-refractive-index material used in the short-pass filter 13. It should be noted here that the higher the dispersion of a main-refractive-index material, the larger the denominator ($nL_{380}$ or $nS_{380}$) compared with the numerator ($nL_{780}$ or $nS_{780}$) in the formula of M, and thus the smaller the value of M. The reason that, in the formula of M, the average dispersion is raised to the power of 0.4 is that, when points (coordinates (M, E)) corresponding to practical and comparative examples described later are plotted in an XY rectangular coordinate system in which the quantity E above is taken as the variable Y and the quantity M above is taken as the variable X, the plotted points then describe generally straight lines on the coordinate plane, and this makes it easy to find the constants that correspond to the upper and lower limits of conditional formula (1) or (2).

Under the influence of wavelength dispersion, the higher the dispersion of a main-refractive-index material (high-refractive-index material) used in the long-pass or short-pass filters 12 or 13, the larger the amount of shift of the cutoff wavelength WL or WS around a wavelength of 380 nm or 780 nm. Accordingly, to make the half-maximum width generally uniform over the entire wavelength range of visible light, the higher the dispersion of a main-refractive-index material used, the higher the ratio of the film thickness gradient GL to the film thickness gradient GS needs to be made so as to further increase the amount of shift, in the direction opposite to that mentioned above, of the cutoff wavelength WL or WS around a wavelength of 380 nm or 780 nm. That is, in terms of the relationship between the quantities M and E mentioned above, it can be said that, the smaller the value of M (the higher the dispersion of a main-refractive-index material), the larger the value of E needs to be made.

In contrast, a lower dispersion in a main-refractive-index material results in a smaller influence of dispersion (a smaller wavelength-related variation in refractive index); thus, it is then not necessary to increase so much as with a higher dispersion the amount of shift of the cutoff wavelength WL or WS around a wavelength of 380 nm or 780 nm. Accordingly, it is not necessary to make the ratio of the film thickness gradient GL to the film thickness gradient GS so high as with a higher dispersion. That is, it can be said that, the larger the value of the M (the lower the dispersion of a main-refractive-index material), the smaller the value of E can be.

Figure 15:
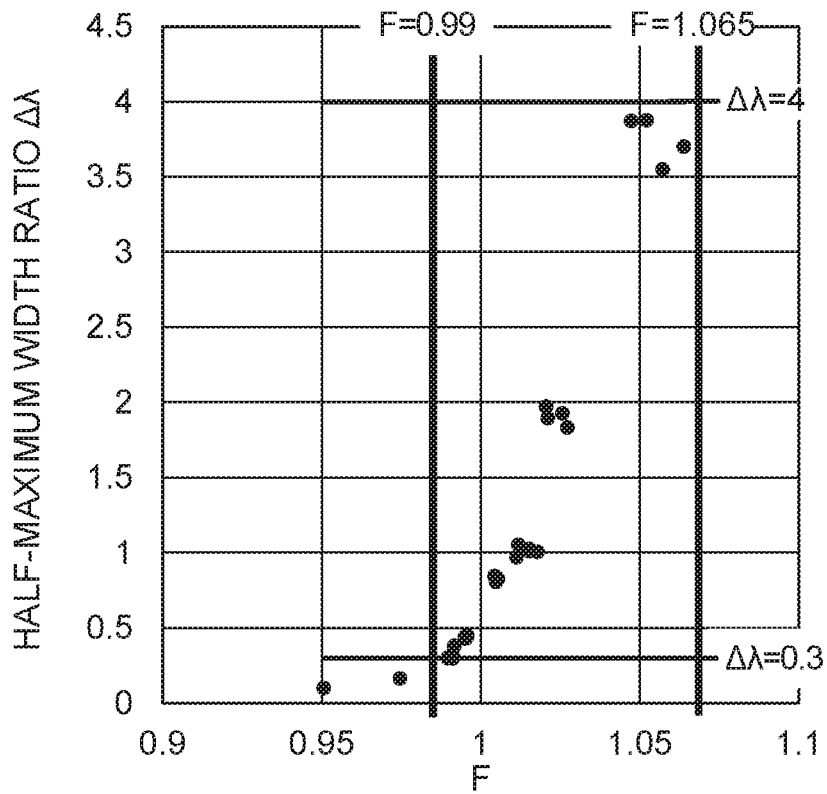
FIG. 15 is a graph showing the relationship between the value of F and the half-maximum width ratio Δλ in conditional formula (A) in practical and comparative examples.

Thus, E and M are generally in an inversely proportional relationship. Accordingly, what has to be done to make the half-maximum width generally uniform over the entire wavelength range of visible light is to explore conditions under which the value of F, which equals E multiplied by M, falls in a given range. FIG. 15 is a graph showing the relationship between the value of F and the half-maximum width ratio Δλ in conditional formula (A) in the practical and comparative examples described later. As shown there, when the value of F is equal to or more than 0.99 but equal to or less than 1.065, Δλ is equal to or more than 0.3 but equal to or less than 4, and thus conditional formula (A) noted above is fulfilled. That is, when conditional formula (1) or (1') is fulfilled, conditional formula (A) is fulfilled. This, it can be said, make it possible to obtain a half-maximum width that is generally uniform over the entire wavelength range of visible light. It should be noted that the lower limit value (0.99) and the upper limit value (1.065) of F correspond to the lower and upper limit values, respectively, of the constant "a" in a regression formula (y=a/x) constructed based on the points corresponding to the practical and comparative examples described later.

Figure 16:
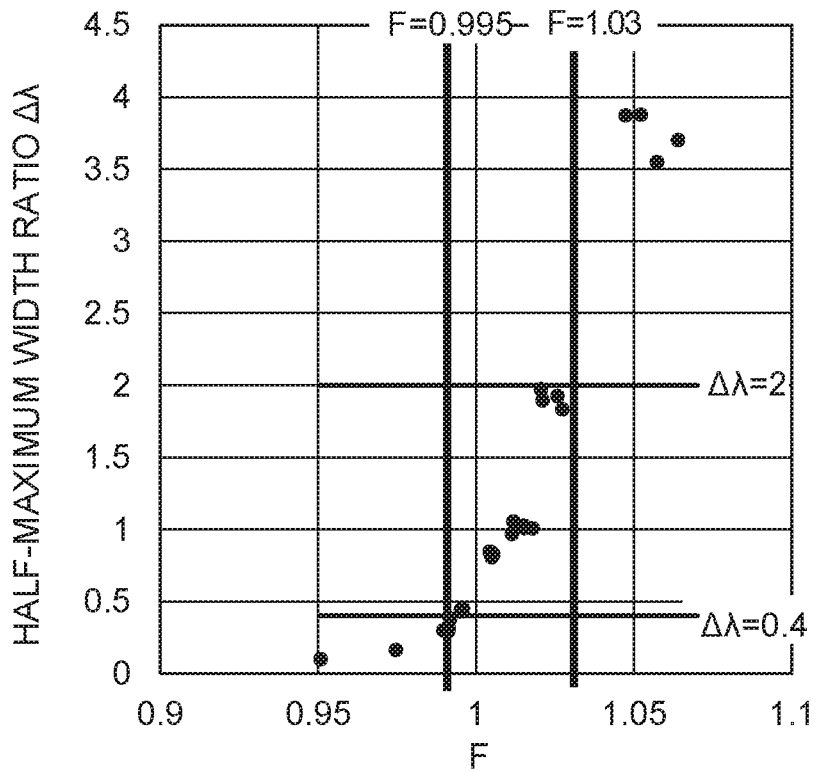
FIG. 16 is a graph showing the relationship between the value of F and the half-maximum width ratio Δλ in conditional formula (B) in practical and comparative examples.

FIG. 16 is a graph showing the relationship between the value of F and the half-maximum width ratio Δλ in conditional formula (B) in the practical and comparative examples described later. As shown there, when the value of F is equal to or more than 0.995 but equal to or less than 1.03, Δλ is equal to or more than 0.4 but equal to or less than 2, and thus conditional formula (B) noted above is fulfilled. That is, when conditional formula (2) or (2') is fulfilled, conditional formula (B) is fulfilled. This, it can be said, makes it possible to obtain a half-maximum width that is more uniform over the entire wavelength range of visible light. It should be noted that the lower limit value (0.995) and the upper limit value (1.03) of F correspond to the lower and upper limit values, respectively, of the constant "a" in a regression formula (y=a/x) constructed based on the points corresponding to the practical and comparative examples described later.

PRACTICAL EXAMPLES

By using long-pass filters and short-pass filters with specific film thickness gradients, a plurality of spectral filters were designed. A description will now be given of the results of examination of the characteristics of these spectral filters. Of the plurality of spectral filters designed, those which are representative are taken as Practical Examples 1 to 7 and Comparative Examples 1 to 3.

Here, considered as high-refractive-index materials were a high-refractive-index material H1 comprising $Nb_2O_5$ and high-refractive-index materials H2 to H4 obtained by varying the dispersion of the high-refractive-index material HE On the other hand, considered as a low-refractive-index material was a low-refractive-index material L1 comprising $SiO_2$. Table 1 shows the dispersion data (refractive indices at varying wavelengths) of the high-refractive-index materials H1 to H4, and Table 2 shows the dispersion data of the low-refractive-index material L1.

TABLE 1

| Wavelength (nm) | Refractive Index | | | |
|---|---|---|---|---|
| | H1 | H2 | H3 | H4 |
| 300 | 3.437 | 2.908 | 2.591 | 3.807 |
| 320 | 3.026 | 2.703 | 2.509 | 3.252 |
| 340 | 2.821 | 2.601 | 2.468 | 2.976 |
| 360 | 2.699 | 2.540 | 2.444 | 2.811 |
| 380 | 2.618 | 2.499 | 2.428 | 2.702 |
| 400 | 2.560 | 2.470 | 2.416 | 2.624 |
| 420 | 2.517 | 2.449 | 2.407 | 2.565 |
| 440 | 2.483 | 2.432 | 2.401 | 2.520 |
| 460 | 2.457 | 2.418 | 2.395 | 2.483 |
| 480 | 2.435 | 2.407 | 2.391 | 2.454 |
| 500 | 2.416 | 2.398 | 2.387 | 2.429 |
| 520 | 2.401 | 2.390 | 2.384 | 2.408 |
| 540 | 2.387 | 2.384 | 2.381 | 2.390 |
| 560 | 2.376 | 2.378 | 2.379 | 2.374 |
| 580 | 2.366 | 2.373 | 2.377 | 2.361 |
| 600 | 2.357 | 2.368 | 2.375 | 2.349 |
| 620 | 2.349 | 2.365 | 2.374 | 2.338 |
| 640 | 2.342 | 2.361 | 2.372 | 2.329 |
| 660 | 2.336 | 2.358 | 2.371 | 2.320 |
| 680 | 2.330 | 2.355 | 2.370 | 2.312 |
| 700 | 2.325 | 2.352 | 2.369 | 2.305 |
| 720 | 2.320 | 2.350 | 2.368 | 2.299 |
| 740 | 2.315 | 2.348 | 2.367 | 2.293 |
| 760 | 2.311 | 2.346 | 2.366 | 2.287 |
| 780 | 2.308 | 2.344 | 2.366 | 2.282 |
| 800 | 2.304 | 2.342 | 2.365 | 2.278 |
| 820 | 2.301 | 2.341 | 2.364 | 2.273 |
| 840 | 2.298 | 2.339 | 2.364 | 2.269 |
| 860 | 2.295 | 2.338 | 2.363 | 2.266 |
| 880 | 2.293 | 2.336 | 2.363 | 2.262 |
| 900 | 2.290 | 2.335 | 2.362 | 2.259 |
| 920 | 2.288 | 2.334 | 2.362 | 2.256 |
| 940 | 2.286 | 2.333 | 2.361 | 2.253 |
| 960 | 2.284 | 2.332 | 2.361 | 2.250 |
| 980 | 2.282 | 2.331 | 2.360 | 2.248 |
| 1000 | 2.280 | 2.330 | 2.360 | 2.245 |

TABLE 1-continued

| Wavelength (nm) | Refractive Index | | | |
|---|---|---|---|---|
| | H1 | H2 | H3 | H4 |

TABLE 2

| Wavelength (nm) | Refractive Index L1 |
|---|---|
| 350 | 1.487 |
| 370 | 1.485 |
| 390 | 1.484 |
| 410 | 1.482 |
| 430 | 1.481 |
| 450 | 1.480 |
| 470 | 1.479 |
| 490 | 1.478 |
| 510 | 1.477 |
| 530 | 1.477 |
| 550 | 1.476 |
| 570 | 1.475 |
| 590 | 1.475 |
| 610 | 1.474 |
| 630 | 1.474 |
| 650 | 1.473 |
| 670 | 1.473 |
| 690 | 1.472 |
| 710 | 1.472 |
| 730 | 1.471 |
| 750 | 1.471 |
| 770 | 1.471 |
| 790 | 1.470 |
| 810 | 1.470 |
| 830 | 1.470 |
| 850 | 1.469 |
| 870 | 1.469 |
| 890 | 1.469 |
| 910 | 1.469 |
| 930 | 1.468 |
| 950 | 1.468 |
| 970 | 1.468 |
| 990 | 1.468 |
| 1010 | 1.468 |

Considered as a long-pass filter was one of LP1 to LP5, and considered as a short-pass filter was one of SP1 to SP5. LP1 to LP5 were built by stacking together layers of one or more kinds of materials selected from the high-refractive-index materials H1 to H4 and layers of the low-refractive-index material L1. Table 3 to Table 7 show, for LP1 to LP5 respectively, the reference layer configuration at the transmission position for a wavelength of 380 nm. Based on this reference layer configuration, the film thicknesses of each layer at the transmission positions for varying wavelengths are determined such that the desired film thickness gradient GL is obtained. For example, if the total film thickness of LP1 at the transmission position for a wavelength of 380 nm as observed when the desired film thickness gradient GL is obtained is 1942.5 nm, since the total film thickness of all the layers shown in Table 3 is 1962.1 nm, the film thicknesses of the respective films at the transmission position for a wavelength of 380 nm are set at the values obtained by multiplying the film thicknesses shown in Table 3 by a coefficient (1942.5/1962.1). The film thicknesses of the respective layers at the transmission positions for other wavelengths are set in similar manners.

On the other hand, SP1 to SP5 were built by stacking together layers of one or more kinds of materials selected from the high-refractive-index materials H1 to H4 and layers of the low-refractive-index material L1. Table 8 to Table 12 show, for SP1 to SP5 respectively, the reference layer configuration at the transmission position for a wavelength of 380 nm. Based on this reference layer configuration, the film thicknesses of the respective layers at the transmission positions for different wavelengths are set, in similar manners as with LP1 to LP5, such that the desired film thickness gradient GS is obtained.

In the tables referred to in the following description, layer numbers are the number of the layers as counted from the substrate side, and all film thicknesses are physical film thickness.

TABLE 3-continued

LP1 Layer Configuration

| Layer No. | Low- or High- Refractive Index Material | Film Thickness (nm) |
|---|---|---|
| 59 | L1 | 55.22 |
| 60 | H1 | 29.29 |
| 61 | L1 | 35.5 |
| 62 | H1 | 22.42 |

TABLE 3

LP1 Layer Configuration

| Layer No. | Low- or High- Refractive Index Material | Film Thickness (nm) |
|---|---|---|
| 1 | L1 | 52.36 |
| 2 | H1 | 25.91 |
| 3 | L1 | 22.02 |
| 4 | H1 | 15.22 |
| 5 | L1 | 29.03 |
| 6 | H1 | 16.12 |
| 7 | L1 | 33.89 |
| 8 | H1 | 20.66 |
| 9 | L1 | 20.13 |
| 10 | H1 | 15.79 |
| 11 | L1 | 38.56 |
| 12 | H1 | 41.37 |
| 13 | L1 | 38.4 |
| 14 | H1 | 20.78 |
| 15 | L1 | 21.17 |
| 16 | H1 | 13.41 |
| 17 | L1 | 32.01 |
| 18 | H1 | 18.96 |
| 19 | L1 | 21.22 |
| 20 | H1 | 15.2 |
| 21 | L1 | 34.06 |
| 22 | H1 | 24.26 |
| 23 | L1 | 46.84 |
| 24 | H1 | 46.29 |
| 25 | L1 | 39.79 |
| 26 | H1 | 22.47 |
| 27 | L1 | 29.1 |
| 28 | H1 | 13.43 |
| 29 | L1 | 39.49 |
| 30 | H1 | 25.53 |
| 31 | L1 | 40.74 |
| 32 | H1 | 25.75 |
| 33 | L1 | 44.88 |
| 34 | H1 | 19.13 |
| 35 | L1 | 16.36 |
| 36 | H1 | 26.9 |
| 37 | L1 | 46.93 |
| 38 | H1 | 28.14 |
| 39 | L1 | 45.65 |
| 40 | H1 | 27.3 |
| 41 | L1 | 34.83 |
| 42 | H1 | 13.55 |
| 43 | L1 | 32.75 |
| 44 | H1 | 27.06 |
| 45 | L1 | 41.09 |
| 46 | H1 | 28.2 |
| 47 | L1 | 52.01 |
| 48 | H1 | 32.93 |
| 49 | L1 | 49.74 |
| 50 | H1 | 31.26 |
| 51 | L1 | 51.62 |
| 52 | H1 | 30.36 |
| 53 | L1 | 47.45 |
| 54 | H1 | 29.55 |
| 55 | L1 | 49.88 |
| 56 | H1 | 29.58 |
| 57 | L1 | 49.54 |
| 58 | H1 | 33.02 |

TABLE 4

LP2 Layer Configuration

| Layer No. | Low- or High- Refractive Index Material | Film Thickness (nm) |
|---|---|---|
| 1 | L1 | 54.44 |
| 2 | H2 | 26.95 |
| 3 | L1 | 22.9 |
| 4 | H2 | 15.83 |
| 5 | L1 | 30.19 |
| 6 | H2 | 16.77 |
| 7 | L1 | 35.24 |
| 8 | H2 | 21.49 |
| 9 | L1 | 20.94 |
| 10 | H2 | 16.42 |
| 11 | L1 | 40.1 |
| 12 | H2 | 43.03 |
| 13 | L1 | 39.93 |
| 14 | H2 | 21.62 |
| 15 | L1 | 22.01 |
| 16 | H2 | 13.94 |
| 17 | L1 | 33.28 |
| 18 | H2 | 19.72 |
| 19 | L1 | 22.07 |
| 20 | H2 | 15.81 |
| 21 | L1 | 35.42 |
| 22 | H2 | 25.24 |
| 23 | L1 | 48.71 |
| 24 | H2 | 48.14 |
| 25 | L1 | 41.37 |
| 26 | H2 | 23.37 |
| 27 | L1 | 30.25 |
| 28 | H2 | 13.96 |
| 29 | L1 | 41.06 |
| 30 | H2 | 26.56 |
| 31 | L1 | 42.36 |
| 32 | H2 | 26.78 |
| 33 | L1 | 46.67 |
| 34 | H2 | 19.9 |
| 35 | L1 | 17.01 |
| 36 | H2 | 27.98 |
| 37 | L1 | 48.8 |
| 38 | H2 | 29.27 |
| 39 | L1 | 47.47 |
| 40 | H2 | 28.4 |
| 41 | L1 | 36.22 |
| 42 | H2 | 14.1 |
| 43 | L1 | 34.06 |
| 44 | H2 | 28.15 |
| 45 | L1 | 42.73 |
| 46 | H2 | 29.33 |
| 47 | L1 | 54.08 |
| 48 | H2 | 34.25 |
| 49 | L1 | 51.72 |
| 50 | H2 | 32.51 |
| 51 | L1 | 53.68 |
| 52 | H2 | 31.58 |
| 53 | L1 | 49.33 |
| 54 | H2 | 30.74 |
| 55 | L1 | 51.87 |
| 56 | H2 | 30.77 |
| 57 | L1 | 51.51 |
| 58 | H2 | 34.34 |

TABLE 4-continued

LP2 Layer Configuration

| Layer No. | Low- or High-Refractive Index Material | Film Thickness (nm) |
|---|---|---|
| 59 | L1 | 57.42 |
| 60 | H2 | 30.46 |
| 61 | L1 | 36.92 |
| 62 | H2 | 23.32 |

TABLE 5

LP3 Layer Configuration

| Layer No. | Low- or High-Refractive Index Material | Film Thickness (nm) |
|---|---|---|
| 1 | L1 | 55.79 |
| 2 | H3 | 27.62 |
| 3 | L1 | 23.46 |
| 4 | H3 | 16.22 |
| 5 | L1 | 30.93 |
| 6 | H3 | 17.19 |
| 7 | L1 | 36.11 |
| 8 | H3 | 22.03 |
| 9 | L1 | 21.45 |
| 10 | H3 | 16.83 |
| 11 | L1 | 41.09 |
| 12 | H3 | 44.11 |
| 13 | L1 | 40.92 |
| 14 | H3 | 22.16 |
| 15 | L1 | 22.55 |
| 16 | H3 | 14.29 |
| 17 | L1 | 34.11 |
| 18 | H3 | 20.21 |
| 19 | L1 | 22.62 |
| 20 | H3 | 16.2 |
| 21 | L1 | 36.3 |
| 22 | H3 | 25.87 |
| 23 | L1 | 49.91 |
| 24 | H3 | 49.34 |
| 25 | L1 | 42.4 |
| 26 | H3 | 23.95 |
| 27 | L1 | 31.01 |
| 28 | H3 | 14.31 |
| 29 | L1 | 42.08 |
| 30 | H3 | 27.22 |
| 31 | L1 | 43.41 |
| 32 | H3 | 27.45 |
| 33 | L1 | 47.82 |
| 34 | H3 | 20.4 |
| 35 | L1 | 17.43 |
| 36 | H3 | 28.68 |
| 37 | L1 | 50.01 |
| 38 | H3 | 30 |
| 39 | L1 | 48.65 |
| 40 | H3 | 29.11 |
| 41 | L1 | 37.12 |
| 42 | H3 | 14.45 |
| 43 | L1 | 34.9 |
| 44 | H3 | 28.85 |
| 45 | L1 | 43.79 |
| 46 | H3 | 30.06 |
| 47 | L1 | 55.42 |
| 48 | H3 | 35.1 |
| 49 | L1 | 53 |
| 50 | H3 | 33.33 |
| 51 | L1 | 55.01 |
| 52 | H3 | 32.36 |
| 53 | L1 | 50.56 |
| 54 | H3 | 31.51 |
| 55 | L1 | 53.15 |
| 56 | H3 | 31.54 |
| 57 | L1 | 52.79 |
| 58 | H3 | 35.2 |

TABLE 5-continued

LP3 Layer Configuration

| Layer No. | Low- or High-Refractive Index Material | Film Thickness (nm) |
|---|---|---|
| 59 | L1 | 58.84 |
| 60 | H3 | 31.22 |
| 61 | L1 | 37.83 |
| 62 | H3 | 23.9 |

TABLE 6

LP4 Layer Configuration

| Layer No. | Low- or High-Refractive Index Material | Film Thickness (nm) |
|---|---|---|
| 1 | L1 | 50.94 |
| 2 | H4 | 25.21 |
| 3 | L1 | 21.43 |
| 4 | H4 | 14.81 |
| 5 | L1 | 28.25 |
| 6 | H4 | 15.69 |
| 7 | L1 | 32.97 |
| 8 | H4 | 20.11 |
| 9 | L1 | 19.59 |
| 10 | H4 | 15.36 |
| 11 | L1 | 37.52 |
| 12 | H4 | 40.25 |
| 13 | L1 | 37.36 |
| 14 | H4 | 20.22 |
| 15 | L1 | 20.59 |
| 16 | H4 | 13.04 |
| 17 | L1 | 31.14 |
| 18 | H4 | 18.45 |
| 19 | L1 | 20.65 |
| 20 | H4 | 14.79 |
| 21 | L1 | 33.14 |
| 22 | H4 | 23.61 |
| 23 | L1 | 45.58 |
| 24 | H4 | 45.04 |
| 25 | L1 | 38.71 |
| 26 | H4 | 21.86 |
| 27 | L1 | 28.31 |
| 28 | H4 | 13.06 |
| 29 | L1 | 38.42 |
| 30 | H4 | 24.84 |
| 31 | L1 | 39.64 |
| 32 | H4 | 25.06 |
| 33 | L1 | 43.67 |
| 34 | H4 | 18.61 |
| 35 | L1 | 15.91 |
| 36 | H4 | 26.17 |
| 37 | L1 | 45.66 |
| 38 | H4 | 27.38 |
| 39 | L1 | 44.42 |
| 40 | H4 | 26.56 |
| 41 | L1 | 33.89 |
| 42 | H4 | 13.19 |
| 43 | L1 | 31.87 |
| 44 | H4 | 26.33 |
| 45 | L1 | 39.98 |
| 46 | H4 | 27.44 |
| 47 | L1 | 50.6 |
| 48 | H4 | 32.04 |
| 49 | L1 | 48.4 |
| 50 | H4 | 30.41 |
| 51 | L1 | 50.23 |
| 52 | H4 | 29.54 |
| 53 | L1 | 46.16 |
| 54 | H4 | 28.76 |
| 55 | L1 | 48.53 |
| 56 | H4 | 28.78 |
| 57 | L1 | 48.2 |
| 58 | H4 | 32.13 |

TABLE 6-continued

LP4 Layer Configuration

| Layer No. | Low- or High-Refractive Index Material | Film Thickness (nm) |
|---|---|---|
| 59 | L1 | 53.73 |
| 60 | H4 | 28.5 |
| 61 | L1 | 34.55 |
| 62 | H4 | 21.82 |

TABLE 7

LP5 Layer Configuration

| Layer No. | Low- or High-Refractive Index Material | Film Thickness (nm) |
|---|---|---|
| 1 | L1 | 52.36 |
| 2 | H3 | 25.92 |
| 3 | L1 | 22.02 |
| 4 | H1 | 15.22 |
| 5 | L1 | 29.03 |
| 6 | H1 | 16.12 |
| 7 | L1 | 33.89 |
| 8 | H1 | 20.66 |
| 9 | L1 | 20.13 |
| 10 | H1 | 15.79 |
| 11 | L1 | 38.56 |
| 12 | H1 | 41.37 |
| 13 | L1 | 38.4 |
| 14 | H1 | 20.78 |
| 15 | L1 | 21.17 |
| 16 | H1 | 13.41 |
| 17 | L1 | 32.01 |
| 18 | H1 | 18.96 |
| 19 | L1 | 21.22 |
| 20 | H1 | 15.2 |
| 21 | L1 | 34.06 |
| 22 | H1 | 24.26 |
| 23 | L1 | 46.84 |
| 24 | H1 | 46.29 |
| 25 | L1 | 39.79 |
| 26 | H1 | 22.47 |
| 27 | L1 | 29.1 |
| 28 | H1 | 13.43 |
| 29 | L1 | 39.49 |
| 30 | H1 | 25.53 |
| 31 | L1 | 40.74 |
| 32 | H1 | 25.75 |
| 33 | L1 | 44.88 |
| 34 | H1 | 19.13 |
| 35 | L1 | 16.36 |
| 36 | H1 | 26.9 |
| 37 | L1 | 46.93 |
| 38 | H1 | 28.14 |
| 39 | L1 | 45.65 |
| 40 | H1 | 27.3 |
| 41 | L1 | 34.83 |
| 42 | H1 | 13.55 |
| 43 | L1 | 32.75 |
| 44 | H1 | 27.06 |
| 45 | L1 | 41.09 |
| 46 | H1 | 28.2 |
| 47 | L1 | 52.01 |
| 48 | H1 | 32.93 |
| 49 | L1 | 49.74 |
| 50 | H1 | 31.26 |
| 51 | L1 | 51.62 |
| 52 | H1 | 30.36 |
| 53 | L1 | 47.45 |
| 54 | H1 | 29.55 |
| 55 | L1 | 49.88 |
| 56 | H1 | 29.58 |
| 57 | L1 | 49.54 |
| 58 | H1 | 33.02 |

TABLE 7-continued

LP5 Layer Configuration

| Layer No. | Low- or High-Refractive Index Material | Film Thickness (nm) |
|---|---|---|
| 59 | L1 | 55.22 |
| 60 | H1 | 29.29 |
| 61 | L1 | 35.5 |
| 62 | H1 | 22.42 |

TABLE 8

SP1 Layer Configuration

| Layer No. | Low- or High-Refractive Index Material | Film Thickness (nm) |
|---|---|---|
| 1 | H1 | 62.14 |
| 2 | L1 | 80.65 |
| 3 | H1 | 49.51 |
| 4 | L1 | 82.14 |
| 5 | H1 | 48.35 |
| 6 | L1 | 77.25 |
| 7 | H1 | 46.03 |
| 8 | L1 | 78.98 |
| 9 | H1 | 47.87 |
| 10 | L1 | 69.62 |
| 11 | H1 | 47.14 |
| 12 | L1 | 73.63 |
| 13 | H1 | 48.63 |
| 14 | L1 | 75.09 |
| 15 | H1 | 44.42 |
| 16 | L1 | 79.42 |
| 17 | H1 | 46.64 |
| 18 | L1 | 84.16 |
| 19 | H1 | 48.23 |
| 20 | L1 | 94.53 |
| 21 | H1 | 180.32 |
| 22 | L1 | 88.38 |
| 23 | H1 | 52.88 |
| 24 | L1 | 77.93 |
| 25 | H1 | 89.82 |
| 26 | L1 | 101.1 |
| 27 | H1 | 45.13 |
| 28 | L1 | 76.68 |
| 29 | H1 | 115.14 |
| 30 | L1 | 65.4 |
| 31 | H1 | 69 |
| 32 | L1 | 144.59 |
| 33 | H1 | 44.64 |
| 34 | L1 | 80.14 |
| 35 | H1 | 62.29 |
| 36 | L1 | 123.92 |
| 37 | H1 | 54.63 |
| 38 | L1 | 90.27 |
| 39 | H1 | 64.98 |
| 40 | L1 | 108.68 |
| 41 | H1 | 54.03 |
| 42 | L1 | 80.37 |
| 43 | H1 | 84.84 |
| 44 | L1 | 108.41 |
| 45 | H1 | 108.93 |
| 46 | L1 | 84.2 |
| 47 | H1 | 66.08 |
| 48 | L1 | 140.2 |
| 49 | H1 | 46.22 |
| 50 | L1 | 63.76 |
| 51 | H1 | 74.24 |
| 52 | L1 | 118.39 |
| 53 | H1 | 63.23 |
| 54 | L1 | 176.92 |
| 55 | H1 | 79.89 |
| 56 | L1 | 121.42 |
| 57 | H1 | 45.99 |
| 58 | L1 | 142.29 |

TABLE 8-continued

SP1 Layer Configuration

| Layer No. | Low- or High-Refractive Index Material | Film Thickness (nm) |
|---|---|---|
| 59 | H1 | 73.22 |
| 60 | L1 | 166.49 |
| 61 | H1 | 68.94 |
| 62 | L1 | 123.48 |
| 63 | H1 | 68.16 |
| 64 | L1 | 182.07 |
| 65 | H1 | 87.5 |
| 66 | L1 | 110.05 |
| 67 | H1 | 63.75 |
| 68 | L1 | 122.59 |
| 69 | H1 | 68.72 |
| 70 | L1 | 171.22 |
| 71 | H1 | 89.09 |
| 72 | L1 | 128.09 |
| 73 | H1 | 98.02 |
| 74 | L1 | 129.28 |
| 75 | H1 | 84.84 |
| 76 | L1 | 87.48 |
| 77 | H1 | 77.48 |
| 78 | L1 | 197.68 |

TABLE 9

SP2 Layer Configuration

| Layer No. | Low- or High-Refractive Index Material | Film Thickness (nm) |
|---|---|---|
| 1 | H2 | 63.42 |
| 2 | L1 | 82.28 |
| 3 | H2 | 50.53 |
| 4 | L1 | 83.8 |
| 5 | H2 | 49.34 |
| 6 | L1 | 78.81 |
| 7 | H2 | 46.97 |
| 8 | L1 | 80.58 |
| 9 | H2 | 48.85 |
| 10 | L1 | 71.03 |
| 11 | H2 | 48.11 |
| 12 | L1 | 75.12 |
| 13 | H2 | 49.62 |
| 14 | L1 | 76.61 |
| 15 | H2 | 45.33 |
| 16 | L1 | 81.03 |
| 17 | H2 | 47.6 |
| 18 | L1 | 85.86 |
| 19 | H2 | 49.22 |
| 20 | L1 | 96.44 |
| 21 | H2 | 184.02 |
| 22 | L1 | 90.17 |
| 23 | H2 | 53.96 |
| 24 | L1 | 79.5 |
| 25 | H2 | 91.67 |
| 26 | L1 | 103.14 |
| 27 | H2 | 46.06 |
| 28 | L1 | 78.23 |
| 29 | H2 | 117.5 |
| 30 | L1 | 66.72 |
| 31 | H2 | 70.42 |
| 32 | L1 | 147.51 |
| 33 | H2 | 45.56 |
| 34 | L1 | 81.76 |
| 35 | H2 | 63.56 |
| 36 | L1 | 126.43 |
| 37 | H2 | 55.75 |
| 38 | L1 | 92.1 |
| 39 | H2 | 66.31 |
| 40 | L1 | 110.88 |
| 41 | H2 | 55.13 |
| 42 | L1 | 81.99 |

TABLE 9-continued

SP2 Layer Configuration

| Layer No. | Low- or High-Refractive Index Material | Film Thickness (nm) |
|---|---|---|
| 43 | H2 | 86.58 |
| 44 | L1 | 110.6 |
| 45 | H2 | 111.17 |
| 46 | L1 | 85.9 |
| 47 | H2 | 67.44 |
| 48 | L1 | 143.03 |
| 49 | H2 | 47.17 |
| 50 | L1 | 65.04 |
| 51 | H2 | 75.76 |
| 52 | L1 | 120.78 |
| 53 | H2 | 64.52 |
| 54 | L1 | 180.49 |
| 55 | H2 | 81.53 |
| 56 | L1 | 123.87 |
| 57 | H2 | 46.93 |
| 58 | L1 | 145.16 |
| 59 | H2 | 74.72 |
| 60 | L1 | 169.86 |
| 61 | H2 | 70.35 |
| 62 | L1 | 125.98 |
| 63 | H2 | 69.55 |
| 64 | L1 | 185.74 |
| 65 | H2 | 89.29 |
| 66 | L1 | 112.28 |
| 67 | H2 | 65.06 |
| 68 | L1 | 125.06 |
| 69 | H2 | 70.13 |
| 70 | L1 | 174.68 |
| 71 | H2 | 90.92 |
| 72 | L1 | 130.68 |
| 73 | H2 | 100.03 |
| 74 | L1 | 131.9 |
| 75 | H2 | 86.58 |
| 76 | L1 | 89.24 |
| 77 | H2 | 79.07 |
| 78 | L1 | 201.67 |

TABLE 10

SP3 Layer Configuration

| Layer No. | Low- or High-Refractive Index Material | Film Thickness (nm) |
|---|---|---|
| 1 | H3 | 64.22 |
| 2 | L1 | 83.31 |
| 3 | H3 | 51.17 |
| 4 | L1 | 84.85 |
| 5 | H3 | 49.97 |
| 6 | L1 | 79.8 |
| 7 | H3 | 47.57 |
| 8 | L1 | 81.59 |
| 9 | H3 | 49.48 |
| 10 | L1 | 71.92 |
| 11 | H3 | 48.72 |
| 12 | L1 | 76.07 |
| 13 | H3 | 50.26 |
| 14 | L1 | 77.57 |
| 15 | H3 | 45.91 |
| 16 | L1 | 82.04 |
| 17 | H3 | 48.21 |
| 18 | L1 | 86.93 |
| 19 | H3 | 49.84 |
| 20 | L1 | 97.65 |
| 21 | H3 | 186.36 |
| 22 | L1 | 91.3 |
| 23 | H3 | 54.65 |
| 24 | L1 | 80.5 |
| 25 | H3 | 92.83 |
| 26 | L1 | 104.44 |

TABLE 10-continued

SP3 Layer Configuration

| Layer No. | Low- or High-Refractive Index Material | Film Thickness (nm) |
|---|---|---|
| 27 | H3 | 46.64 |
| 28 | L1 | 79.21 |
| 29 | H3 | 119 |
| 30 | L1 | 67.56 |
| 31 | H3 | 71.31 |
| 32 | L1 | 149.36 |
| 33 | H3 | 46.14 |
| 34 | L1 | 82.78 |
| 35 | H3 | 64.37 |
| 36 | L1 | 128.02 |
| 37 | H3 | 56.46 |
| 38 | L1 | 93.25 |
| 39 | H3 | 67.15 |
| 40 | L1 | 112.27 |
| 41 | H3 | 55.84 |
| 42 | L1 | 83.02 |
| 43 | H3 | 87.68 |
| 44 | L1 | 111.99 |
| 45 | H3 | 112.58 |
| 46 | L1 | 86.98 |
| 47 | H3 | 68.3 |
| 48 | L1 | 144.83 |
| 49 | H3 | 47.77 |
| 50 | L1 | 65.86 |
| 51 | H3 | 76.73 |
| 52 | L1 | 122.3 |
| 53 | H3 | 65.35 |
| 54 | L1 | 182.76 |
| 55 | H3 | 82.57 |
| 56 | L1 | 125.43 |
| 57 | H3 | 47.53 |
| 58 | L1 | 146.99 |
| 59 | H3 | 75.67 |
| 60 | L1 | 171.99 |
| 61 | H3 | 71.25 |
| 62 | L1 | 127.56 |
| 63 | H3 | 70.44 |
| 64 | L1 | 188.08 |
| 65 | H3 | 90.43 |
| 66 | L1 | 113.69 |
| 67 | H3 | 65.89 |
| 68 | L1 | 126.63 |
| 69 | H3 | 71.03 |
| 70 | L1 | 176.87 |
| 71 | H3 | 92.07 |
| 72 | L1 | 132.32 |
| 73 | H3 | 101.31 |
| 74 | L1 | 133.55 |
| 75 | H3 | 87.69 |
| 76 | L1 | 90.36 |
| 77 | H3 | 80.07 |
| 78 | L1 | 204.21 |

TABLE 11

SP4 Layer Configuration

| Layer No. | Low- or High-Refractive Index Material | Film Thickness (nm) |
|---|---|---|
| 1 | H4 | 61.27 |
| 2 | L1 | 79.52 |
| 3 | H4 | 48.82 |
| 4 | L1 | 80.99 |
| 5 | H4 | 47.67 |
| 6 | L1 | 76.17 |
| 7 | H4 | 45.38 |
| 8 | L1 | 77.88 |
| 9 | H4 | 47.2 |
| 10 | L1 | 68.64 |
| 11 | H4 | 46.48 |
| 12 | L1 | 72.6 |
| 13 | H4 | 47.95 |
| 14 | L1 | 74.04 |
| 15 | H4 | 43.8 |
| 16 | L1 | 78.31 |
| 17 | H4 | 45.99 |
| 18 | L1 | 82.98 |
| 19 | H4 | 47.55 |
| 20 | L1 | 93.2 |
| 21 | H4 | 177.8 |
| 22 | L1 | 87.14 |
| 23 | H4 | 52.14 |
| 24 | L1 | 76.84 |
| 25 | H4 | 88.57 |
| 26 | L1 | 99.69 |
| 27 | H4 | 44.5 |
| 28 | L1 | 75.61 |
| 29 | H4 | 113.53 |
| 30 | L1 | 64.49 |
| 31 | H4 | 68.04 |
| 32 | L1 | 142.56 |
| 33 | H4 | 44.02 |
| 34 | L1 | 79.01 |
| 35 | H4 | 61.41 |
| 36 | L1 | 122.19 |
| 37 | H4 | 53.87 |
| 38 | L1 | 89.01 |
| 39 | H4 | 64.07 |
| 40 | L1 | 107.16 |
| 41 | H4 | 53.27 |
| 42 | L1 | 79.24 |
| 43 | H4 | 83.65 |
| 44 | L1 | 106.9 |
| 45 | H4 | 107.41 |
| 46 | L1 | 83.02 |
| 47 | H4 | 65.16 |
| 48 | L1 | 138.24 |
| 49 | H4 | 45.57 |
| 50 | L1 | 62.86 |
| 51 | H4 | 73.2 |
| 52 | L1 | 116.74 |
| 53 | H4 | 62.34 |
| 54 | L1 | 174.44 |
| 55 | H4 | 78.77 |
| 56 | L1 | 119.72 |
| 57 | H4 | 45.35 |
| 58 | L1 | 140.3 |
| 59 | H4 | 72.19 |
| 60 | L1 | 164.16 |
| 61 | H4 | 67.97 |
| 62 | L1 | 121.75 |
| 63 | H4 | 67.2 |
| 64 | L1 | 179.52 |
| 65 | H4 | 86.27 |
| 66 | L1 | 108.51 |
| 67 | H4 | 62.86 |
| 68 | L1 | 120.87 |
| 69 | H4 | 67.76 |
| 70 | L1 | 168.82 |
| 71 | H4 | 87.84 |
| 72 | L1 | 126.3 |
| 73 | H4 | 96.65 |
| 74 | L1 | 127.47 |
| 75 | H4 | 83.65 |
| 76 | L1 | 86.25 |
| 77 | H4 | 76.39 |
| 78 | L1 | 194.91 |

TABLE 12

SP5 Layer Configuration

| Layer No. | Low- or High-Refractive Index Material | Film Thickness (nm) |
|---|---|---|
| 1 | H3 | 62.17 |
| 2 | L1 | 80.65 |
| 3 | H1 | 49.51 |
| 4 | L1 | 82.14 |
| 5 | H1 | 48.35 |
| 6 | L1 | 77.25 |
| 7 | H1 | 46.03 |
| 8 | L1 | 78.98 |
| 9 | H1 | 47.87 |
| 10 | L1 | 69.62 |
| 11 | H1 | 47.14 |
| 12 | L1 | 73.63 |
| 13 | H1 | 48.63 |
| 14 | L1 | 75.09 |
| 15 | H1 | 44.42 |
| 16 | L1 | 79.42 |
| 17 | H1 | 46.64 |
| 18 | L1 | 84.16 |
| 19 | H1 | 48.23 |
| 20 | L1 | 94.53 |
| 21 | H1 | 180.32 |
| 22 | L1 | 88.38 |
| 23 | H1 | 52.88 |
| 24 | L1 | 77.93 |
| 25 | H1 | 89.82 |
| 26 | L1 | 101.1 |
| 27 | H1 | 45.13 |
| 28 | L1 | 76.68 |
| 29 | H1 | 115.14 |
| 30 | L1 | 65.4 |
| 31 | H1 | 69 |
| 32 | L1 | 144.59 |
| 33 | H1 | 44.64 |
| 34 | L1 | 80.14 |
| 35 | H1 | 62.29 |
| 36 | L1 | 123.92 |
| 37 | H1 | 54.63 |
| 38 | L1 | 90.27 |
| 39 | H1 | 64.98 |
| 40 | L1 | 108.68 |
| 41 | H1 | 54.03 |
| 42 | L1 | 80.37 |
| 43 | H1 | 84.84 |
| 44 | L1 | 108.41 |
| 45 | H1 | 108.93 |
| 46 | L1 | 84.2 |
| 47 | H1 | 66.08 |
| 48 | L1 | 140.2 |
| 49 | H1 | 46.22 |
| 50 | L1 | 63.76 |
| 51 | H1 | 74.24 |
| 52 | L1 | 118.39 |
| 53 | H1 | 63.23 |
| 54 | L1 | 176.92 |
| 55 | H1 | 79.89 |
| 56 | L1 | 121.42 |
| 57 | H1 | 45.99 |
| 58 | L1 | 142.29 |
| 59 | H1 | 73.22 |
| 60 | L1 | 166.49 |
| 61 | H1 | 68.94 |
| 62 | L1 | 123.48 |
| 63 | H1 | 68.16 |
| 64 | L1 | 182.07 |
| 65 | H1 | 87.5 |
| 66 | L1 | 110.05 |
| 67 | H1 | 63.75 |
| 68 | L1 | 122.59 |
| 69 | H1 | 68.72 |
| 70 | L1 | 171.22 |
| 71 | H1 | 89.09 |
| 72 | L1 | 128.09 |
| 73 | H1 | 98.02 |
| 74 | L1 | 129.28 |
| 75 | H1 | 84.84 |
| 76 | L1 | 87.48 |
| 77 | H1 | 77.48 |
| 78 | L1 | 197.68 |

The layer configuration of LP5 shown in Table 7 results from simply replacing, in the second layer in LP1 shown in Table 3, the high-refractive-index material H1 with the high-refractive-index material H3. The layer configuration of SP5 shown in Table 12 results from simply replacing, in the first layer in SP1 shown in Table 8, the high-refractive-index material H1 with the high-refractive-index material H3.

Now, the spectral filters of Practical Examples 1 to 7 and Comparative Examples 1 to 3 will be described in more detail. In the following description, Wavelength 1 refers to a wavelength of 380 nm, Wavelength 2 refers to a wavelength of 480 nm, Wavelength 3 refers to a wavelength of 580 nm, Wavelength 4 refers to a wavelength of 680 nm, and Wavelength 5 refers to a wavelength of 780 nm. Wavelength 1 to 5 all refer to the wavelengths at which the transmittance peaks (peak wavelengths).

Practical Example 1

Figure 17:
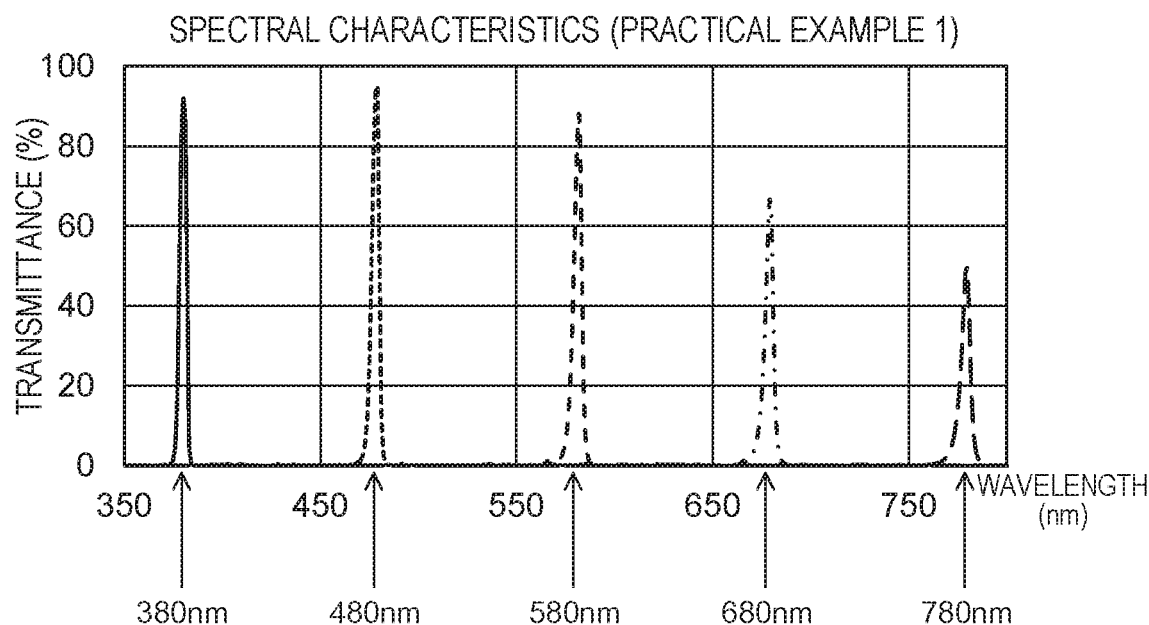
FIG. 17 is a graph showing the spectral characteristics of the spectral filter of Practical Example 1.

In Practical Example 1, a spectral filter was designed by adjusting the film thicknesses of the respective layers of LP1 and SP1 from the reference film thicknesses shown in Tables 3 and 8 such that the total film thicknesses at the transmission positions for Wavelengths 1 to 5 had the values shown in Table 13. The spectral characteristics of the spectral filter of Practical Example 1 are shown in FIG. 17. Shows as the spectral characteristics are only those observed in the wavelength ranges (transmission portions) in which the transmittance peaks at Wavelengths 1 to 5 (the same applies to other similar drawings).

TABLE 13

Practical Example 1

| Peak Wavelength | Total Film Thickness at Peak-Wavelength Transmission Position (nm) | |
|---|---|---|
| | LP1 | SP1 |
| Wavelength 1 (380 nm) | 1962 | 6878 |
| Wavelength 2 (480 nm) | 2629 | 8941 |
| Wavelength 3 (580 nm) | 3281 | 11018 |
| Wavelength 4 (680 nm) | 3887 | 12951 |
| Wavelength 5 (780 nm) | 4503 | 14925 |

Practical Example 2

Figure 18:
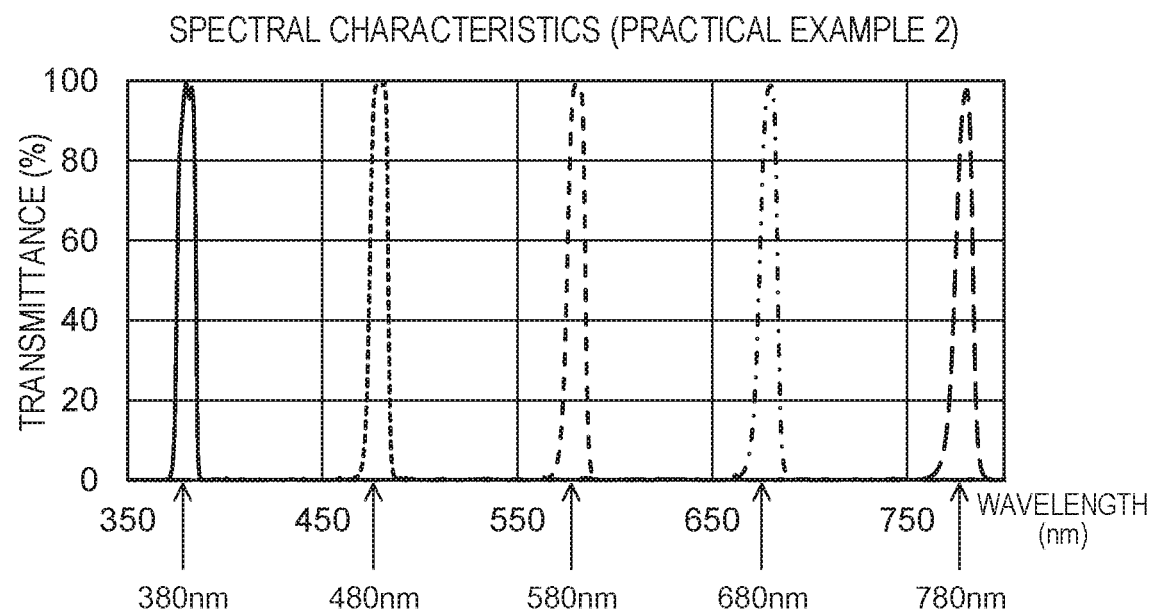
FIG. 18 is a graph showing the spectral characteristics of the spectral filter of Practical Example 2.

In Practical Example 2, a spectral filter was designed by adjusting the film thicknesses of the respective layers of LP1 and SP1 from the reference film thicknesses shown in Tables 3 and 8 such that the total film thicknesses at the transmission positions for Wavelengths 1 to 5 had the values shown in Table 14. The spectral characteristics of the spectral filter of Practical Example 2 are shown in FIG. 18.

TABLE 14

Practical Example 2

| Peak Wavelength | Total Film Thickness at Peak-Wavelength Transmission Position (nm) | |
|---|---|---|
| | LP1 | SP1 |
| Wavelength 1 (380 nm) | 1942 | 6947 |
| Wavelength 2 (480 nm) | 2617 | 9017 |
| Wavelength 3 (580 nm) | 3257 | 11053 |
| Wavelength 4 (680 nm) | 3865 | 13013 |
| Wavelength 5 (780 nm) | 4477 | 14994 |

Practical Example 3

Figure 19:
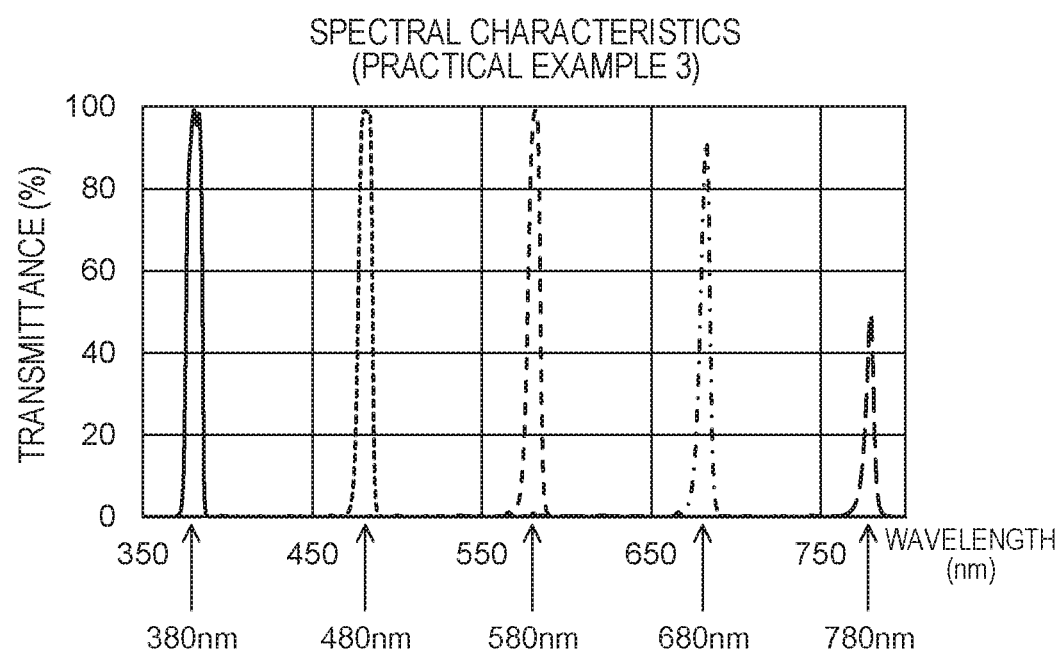
FIG. 19 is a graph showing the spectral characteristics of the spectral filter of Practical Example 3.

In Practical Example 3, a spectral filter was designed by adjusting the film thicknesses of the respective layers of LP1 and SP1 from the reference film thicknesses shown in Tables 3 and 8 such that the total film thicknesses at the transmission positions for Wavelengths 1 to 5 had the values shown in Table 15. The spectral characteristics of the spectral filter of Practical Example 3 are shown in FIG. 19.

TABLE 15

Practical Example 3

| Peak Wavelength | Total Film Thickness at Peak-Wavelength Transmission Position (nm) | |
|---|---|---|
| | LP1 | SP1 |
| Wavelength 1 (380 nm) | 1942 | 6947 |
| Wavelength 2 (480 nm) | 2635 | 9051 |
| Wavelength 3 (580 nm) | 3267 | 11046 |
| Wavelength 4 (680 nm) | 3895 | 13034 |
| Wavelength 5 (780 nm) | 4503 | 14925 |

Practical Example 4

Figure 20:
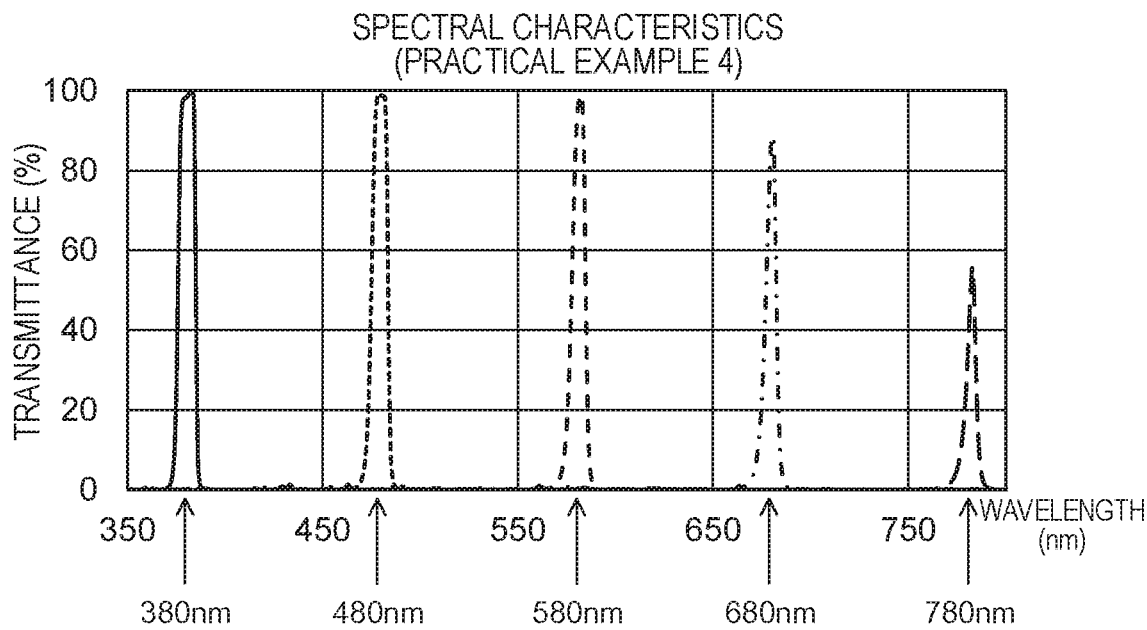
FIG. 20 is a graph showing the spectral characteristics of the spectral filter of Practical Example 4.
Figure 21:
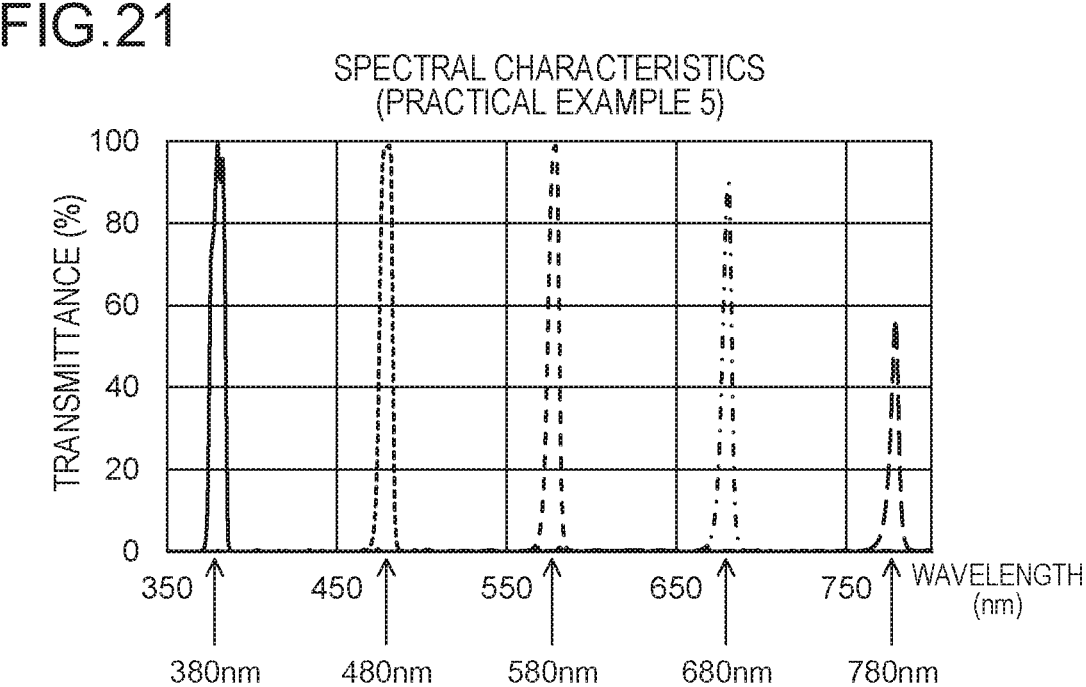
FIG. 21 is a graph showing the spectral characteristics of the spectral filter of Practical Example 5.

In Practical Example 4, a spectral filter was designed by adjusting the film thicknesses of the respective layers of LP2 and SP2 from the reference film thicknesses shown in Tables 4 and 9 such that the total film thicknesses at the transmission positions for Wavelengths 1 to 5 had the values shown in Table 16. The spectral characteristics of the spectral filter of Practical Example 4 are shown in FIG. 20.

TABLE 16

Practical Example 4

| Peak Wavelength | Total Film Thickness at Peak-Wavelength Transmission Position (nm) | |
|---|---|---|
| | LP2 | SP2 |
| Wavelength 1 (380 nm) | 2026 | 7081 |
| Wavelength 2 (480 nm) | 2649 | 9053 |
| Wavelength 3 (580 nm) | 3263 | 11032 |
| Wavelength 4 (680 nm) | 3850 | 12927 |
| Wavelength 5 (780 nm) | 4465 | 14892 |

Practical Example 5

In Practical Example 5, a spectral filter was designed by adjusting the film thicknesses of the respective layers of LP4 and SP4 from the reference film thicknesses shown in Tables 6 and 11 such that the total film thicknesses at the transmission positions for Wavelengths 1 to 5 had the values shown in Table 17. The spectral characteristics of the spectral filter of Practical Example 5 are shown in FIG.

TABLE 17

Practical Example 5

| Peak Wavelength | Total Film Thickness at Peak-Wavelength Transmission Position (nm) | |
|---|---|---|
| | LP4 | SP4 |
| Wavelength 1 (380 nm) | 1884 | 6843 |
| Wavelength 2 (480 nm) | 2604 | 8972 |
| Wavelength 3 (580 nm) | 3253 | 10986 |
| Wavelength 4 (680 nm) | 3906 | 13034 |
| Wavelength 5 (780 nm) | 4536 | 14987 |

Practical Example 6

Figure 22:
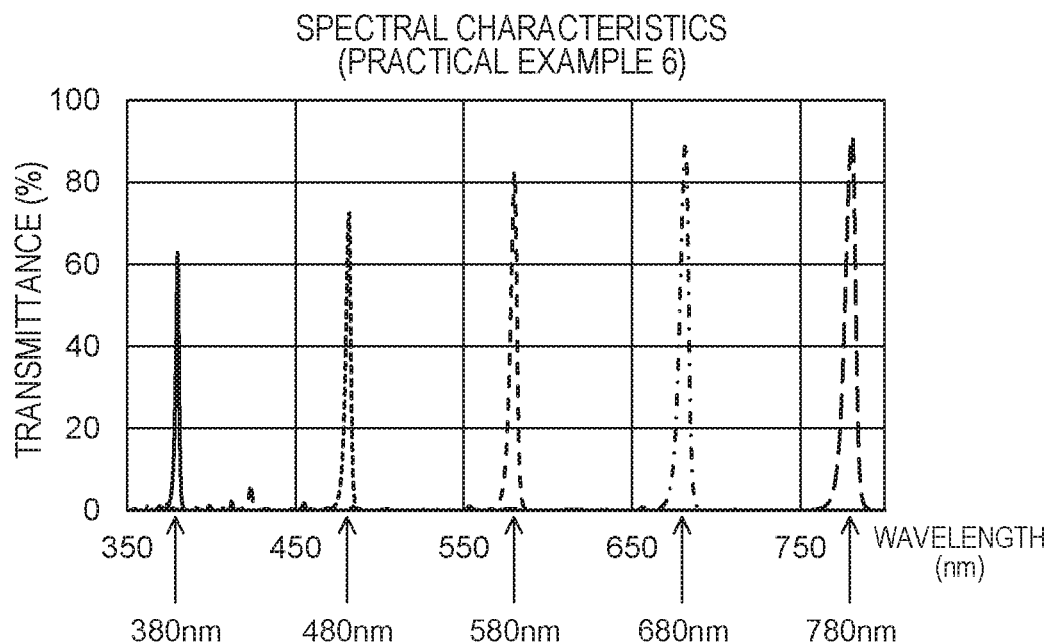
FIG. 22 is a graph showing the spectral characteristics of the spectral filter of Practical Example 6.

In Practical Example 6, a spectral filter was designed by adjusting the film thicknesses of the respective layers of LP3 and SP3 from the reference film thicknesses shown in Tables 5 and 10 such that the total film thicknesses at the transmission positions for Wavelengths 1 to 5 had the values shown in Table 18. The spectral characteristics of the spectral filter of Practical Example 6 are shown in FIG. 22.

TABLE 18

Practical Example 6

| Peak Wavelength | Total Film Thickness at Peak-Wavelength Transmission Position (nm) | |
|---|---|---|
| | LP3 | SP3 |
| Wavelength 1 (380 nm) | 2091 | 7106 |

TABLE 18-continued

Practical Example 6

| Peak Wavelength | Total Film Thickness at Peak-Wavelength Transmission Position (nm) | |
|---|---|---|
| | LP3 | SP3 |
| Wavelength 2 (480 nm) | 2685 | 9075 |
| Wavelength 3 (580 nm) | 3260 | 11001 |
| Wavelength 4 (680 nm) | 3831 | 12933 |
| Wavelength 5 (780 nm) | 4396 | 14845 |

Practical Example 7

Figure 23:
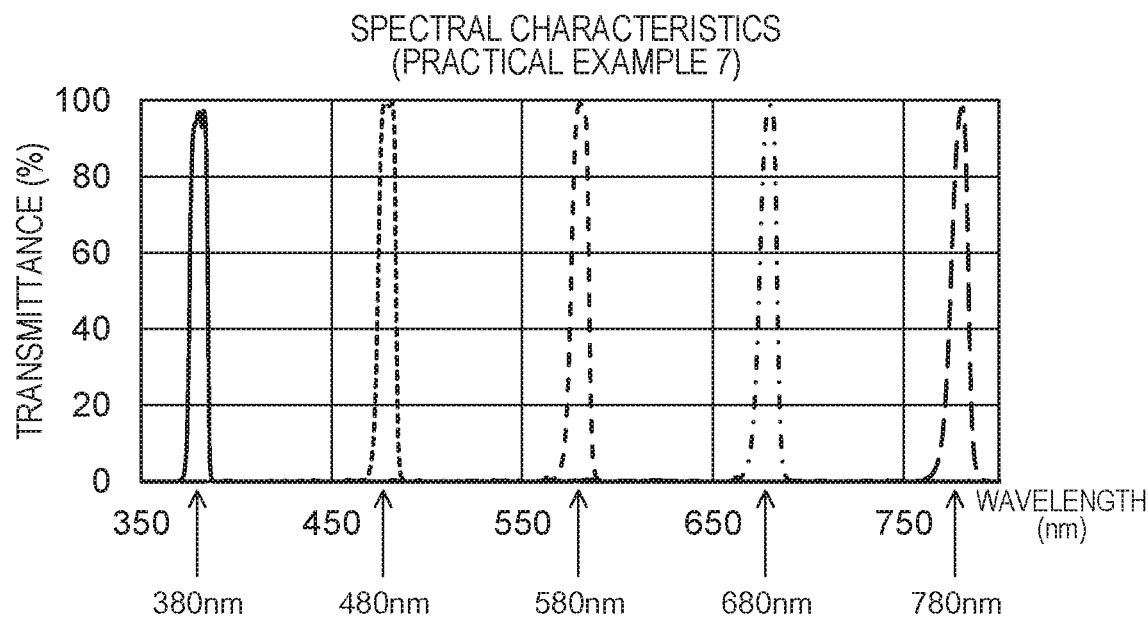
FIG. 23 is a graph showing the spectral characteristics of the spectral filter of Practical Example 7.

In Practical Example 7, a spectral filter was designed by adjusting the film thicknesses of the respective layers of LP5 and SP5 from the reference film thicknesses shown in Tables 7 and 12 such that the total film thicknesses at the transmission positions for Wavelengths 1 to 5 had the values shown in Table 19. The spectral characteristics of the spectral filter of Practical Example 7 are shown in FIG. 23.

TABLE 19

Practical Example 7

| Peak Wavelength | Total Film Thickness at Peak-Wavelength Transmission Position (nm) | |
|---|---|---|
| | LP5 | SP5 |
| Wavelength 1 (380 nm) | 1942 | 6947 |
| Wavelength 2 (480 nm) | 2617 | 9017 |
| Wavelength 3 (580 nm) | 3257 | 11053 |
| Wavelength 4 (680 nm) | 3865 | 13013 |
| Wavelength 5 (780 nm) | 4477 | 14994 |

Comparative Example 1

In Comparative Example 1, a spectral filter was designed by adjusting the film thicknesses of the respective layers of LP1 and SP1 from the reference film thicknesses shown in Tables 3 and 8 such that the total film thicknesses at the transmission positions for Wavelengths 1 to 5 had the values shown in Table 20. The spectral characteristics of the spectral filter of Comparative Example 1 are shown in FIG. 24.

TABLE 20

Comparative Example 1

| Peak Wavelength | Total Film Thickness at Peak-Wavelength Transmission Position (nm) | |
|---|---|---|
| | LP1 | SP1 |
| Wavelength 1 (380 nm) | 1962 | 6878 |

TABLE 20-continued

Comparative Example 1

| Peak Wavelength | Total Film Thickness at Peak-Wavelength Transmission Position (nm) | |
|---|---|---|
| | LP1 | SP1 |
| Wavelength 2 (480 nm) | 2600 | 9113 |
| Wavelength 3 (580 nm) | 3188 | 11177 |
| Wavelength 4 (680 nm) | 3777 | 13240 |
| Wavelength 5 (780 nm) | 4317 | 15131 |

Comparative Example 2

Figure 25:
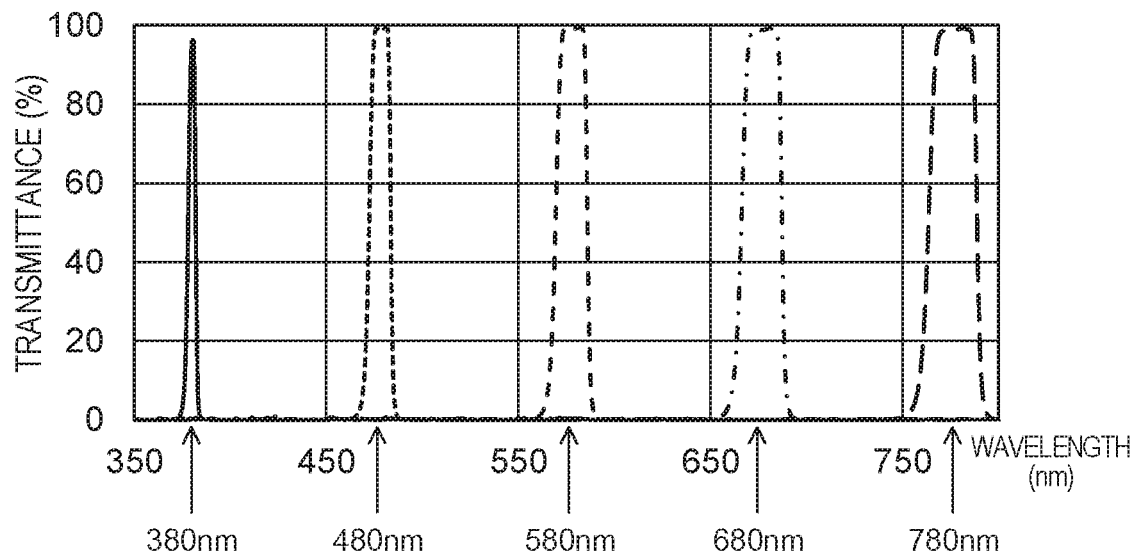
FIG. 25 is a graph showing the spectral characteristics of the spectral filter of Comparative Example 2.

In Comparative Example 2, a spectral filter was designed by adjusting the film thicknesses of the respective layers of LP2 and SP2 from the reference film thicknesses shown in Tables 4 and 9 such that the total film thicknesses at the transmission positions for Wavelengths 1 to 5 had the values shown in Table 21. The spectral characteristics of the spectral filter of Comparative Example 2 are shown in FIG. 25.

TABLE 21

Comparative Example 2

| Peak Wavelength | Total Film Thickness at Peak-Wavelength Transmission Position (nm) | |
|---|---|---|
| | LP2 | SP2 |
| Wavelength 1 (380 nm) | 2040 | 7018 |
| Wavelength 2 (480 nm) | 2632 | 9053 |
| Wavelength 3 (580 nm) | 3214 | 11053 |
| Wavelength 4 (680 nm) | 3785 | 13018 |
| Wavelength 5 (780 nm) | 4356 | 14983 |

Comparative Example 3

Figure 26:
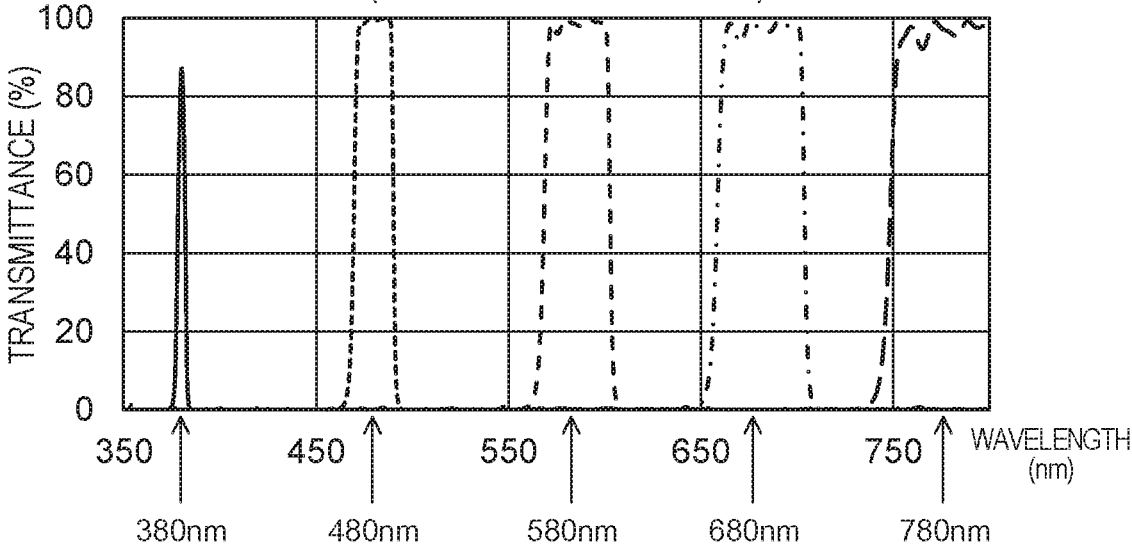
FIG. 26 is a graph showing the spectral characteristics of the spectral filter of Comparative Example 3.

In Comparative Example 3, a spectral filter was designed by adjusting the film thicknesses of the respective layers of LP4 and SP4 from the reference film thicknesses shown in Tables 6 and 11 such that the total film thicknesses at the transmission positions for Wavelengths 1 to 5 had the values shown in Table 22. The spectral characteristics of the spectral filter of Comparative Example 3 are shown in FIG. 26.

TABLE 22

Comparative Example 3

| Peak Wavelength | Total Film Thickness at Peak-Wavelength Transmission Position (nm) | |
|---|---|---|
| | LP4 | SP4 |
| Wavelength 1 (380 nm) | 1909 | 6782 |
| Wavelength 2 (480 nm) | 2568 | 9121 |
| Wavelength 3 (580 nm) | 3217 | 11427 |
| Wavelength 4 (680 nm) | 3790 | 13462 |
| Wavelength 5 (780 nm) | 4353 | 15462 |

Tables 23 and 24 show, at a glance, the values of the parameters in conditional formulae (1), (2), (A), and (B) noted above in Practical Examples 1 to 7 and Comparative Examples 1 to 3. In Table 23, for LP5 and SP5, which each contain a plurality of high-refractive-index materials H1 and H3, the high-refractive-index material H1 with both the largest number of layers and the largest total film thickness is taken as the main-refractive-index material.

TABLE 23

| | | | Film Thickness (nm) | | | | | | | Refractive Index | | | | | | | |
|---|---|---|---|---|---|---|---|---|---|---|---|---|---|---|---|---|---|
| | | | LP | | | SP | | | | LP | | | SP | | | | |
| | | | | | | | | | | Main | | | Main | | | | |
| | LP | SP | 380 nm $dL_{380}$ | 780 nm $dL_{780}$ | $dL_{780}/dL_{380}$ | 380 nm $dS_{380}$ | 780 nm $dS_{780}$ | $dS_{780}/dS_{380}$ | Formula E | Refractive Index Material | 380 nm $nL_{380}$ | 780 nm $nL_{780}$ | Refractive Index Material | 380 nm $nS_{380}$ | 780 nm $nS_{780}$ | Formula M | Formula F |
| Practical Example 1 | LP1 | SP1 | 1962 | 4503 | 2.295 | 6878 | 14925 | 2.170 | 1.058 | H1 | 2.618 | 2.308 | H1 | 2.618 | 2.308 | 0.951 | 1.006 |
| Practical Example 2 | LP1 | SP1 | 1942 | 4477 | 2.305 | 6947 | 14994 | 2.158 | 1.068 | H1 | 2.618 | 2.308 | H1 | 2.618 | 2.308 | 0.951 | 1.015 |
| Practical Example 3 | LP1 | SP1 | 1942 | 4503 | 2.318 | 6947 | 14925 | 2.149 | 1.079 | H1 | 2.618 | 2.308 | H1 | 2.618 | 2.308 | 0.951 | 1.026 |
| Practical Example 4 | LP2 | SP2 | 2026 | 4465 | 2.203 | 7081 | 14892 | 2.103 | 1.048 | H2 | 2.499 | 2.344 | H2 | 2.499 | 2.344 | 0.975 | 1.021 |
| Practical Example 5 | LP4 | SP4 | 1884 | 4536 | 2.407 | 6843 | 14987 | 2.190 | 1.099 | H4 | 2.702 | 2.282 | H4 | 2.702 | 2.282 | 0.935 | 1.027 |
| Practical Example 6 | LP3 | SP3 | 2091 | 4396 | 2.102 | 7106 | 14845 | 2.089 | 1.006 | H3 | 2.428 | 2.366 | H3 | 2.428 | 2.366 | 0.990 | 0.996 |
| Practical Example 7 | LP5 | SP5 | 1942 | 4477 | 2.305 | 6947 | 14994 | 2.158 | 1.068 | H1 | 2.618 | 2.308 | H1 | 2.618 | 2.308 | 0.951 | 1.015 |
| Comparative Example 1 | LP1 | SP1 | 1962 | 4317 | 2.200 | 6878 | 15131 | 2.200 | 1.000 | H1 | 2.618 | 2.308 | H1 | 2.618 | 2.308 | 0.951 | 0.951 |
| Comparative Example 2 | LP2 | SP2 | 2040 | 4356 | 2.135 | 7018 | 14983 | 2.135 | 1.000 | H2 | 2.499 | 2.344 | H2 | 2.499 | 2.344 | 0.975 | 0.975 |
| Comparative Example 3 | LP4 | SP4 | 1909 | 4353 | 2.280 | 6782 | 15462 | 2.280 | 1.000 | H4 | 2.702 | 2.282 | H4 | 2.702 | 2.282 | 0.935 | 0.935 |

TABLE 24

| | Transmittance (%) | | Half-Maximum Width (nm) | | Half-Maximum Width Ratio $\Delta\lambda = \Delta\lambda_{380}/\Delta\lambda_{780}$ |
|---|---|---|---|---|---|
| | 380 nm | 780 nm | $\Delta\lambda_{380}$ | $\Delta\lambda_{780}$ | |
| Practical Example 1 | 92.0 | 49.3 | 4.2 | 5.1 | 0.825 |

TABLE 24-continued

| | Transmittance (%) | | Half-Maximum Width (nm) | | Half-Maximum Width Ratio $\Delta\lambda = \Delta\lambda_{380}/\Delta\lambda_{780}$ |
|---|---|---|---|---|---|
| | 380 nm | 780 nm | $\Delta\lambda_{380}$ | $\Delta\lambda_{780}$ | |
| Practical Example 2 | 99.2 | 97.6 | 9.8 | 9.5 | 1.025 |
| Practical Example 3 | 99.2 | 49.3 | 9.8 | 5.1 | 1.925 |
| Practical Example 4 | 99.8 | 55.7 | 9.3 | 4.9 | 1.894 |
| Practical Example 5 | 99.4 | 56.9 | 9.4 | 5.1 | 1.832 |
| Practical Example 6 | 96.6 | 98.3 | 4.1 | 9.2 | 0.450 |
| Practical Example 7 | 97.3 | 98.1 | 9.7 | 9.6 | 1.009 |
| Comparative Example 1 | 92.0 | 99.3 | 4.2 | 42.9 | 0.098 |
| Comparative Example 2 | 96.2 | 99.2 | 4.1 | 25.4 | 0.162 |
| Comparative Example 3 | 87.2 | 99.3 | 4.1 | 55.6 | 0.074 |

Tables 23 and 24 reveal the following. When E=1 as in Comparative Examples 1 to 3, that is, when the film thickness gradient GL (=$dL_{780}/dL_{380}$) of the long-pass filter and the film thickness gradient GS(=$dS_{780}/dS_{380}$) of the short-pass filter are equal, the half-maximum width ratio $\Delta\lambda$ is smaller than 0.3, pointing to a large variation in the half-maximum width in the wavelength range of visible light. In particular, in Comparative Examples 1 and 3, the half-maximum width $\Delta\lambda_{780}$ of the transmittance at a wavelength of 780 nm is ten times or more of the half-maximum width $\Delta\lambda_{380}$ of the transmittance at a wavelength of 380 nm. Thus, it cannot be said that the half-maximum width is uniform over the entire wavelength range of visible light.

By contrast, when E is larger than 1 as in the practical examples including Practical Examples 1 to 7, that is, when the film thickness gradient GL is larger than the film thickness gradient GS, the half-maximum width ratio $\Delta\lambda$ falls in the range of 0.3 to 4, pointing to a small variation in the half-maximum width in the wavelength range of visible light. Thus, it can be said that, with E larger than 1, it is possible to build a spectral filter in which the half-maximum width is generally uniform over the entire wavelength range of visible light. In particular, in Practical Examples 1 to 7, the half-maximum width ratio $\Delta\lambda$ falls in the range of 0.4 to 2, and it can be said that the difference between the half-maximum width $\Delta\lambda_{380}$ and the half-maximum width $\Delta\lambda_{780}$ is definitely small, and thus it is possible, it can be said, to build a spectral filter in which the half-maximum width is more uniform over the entire wavelength range of visible light (see FIGS. 17 to 23).

Figure 27:
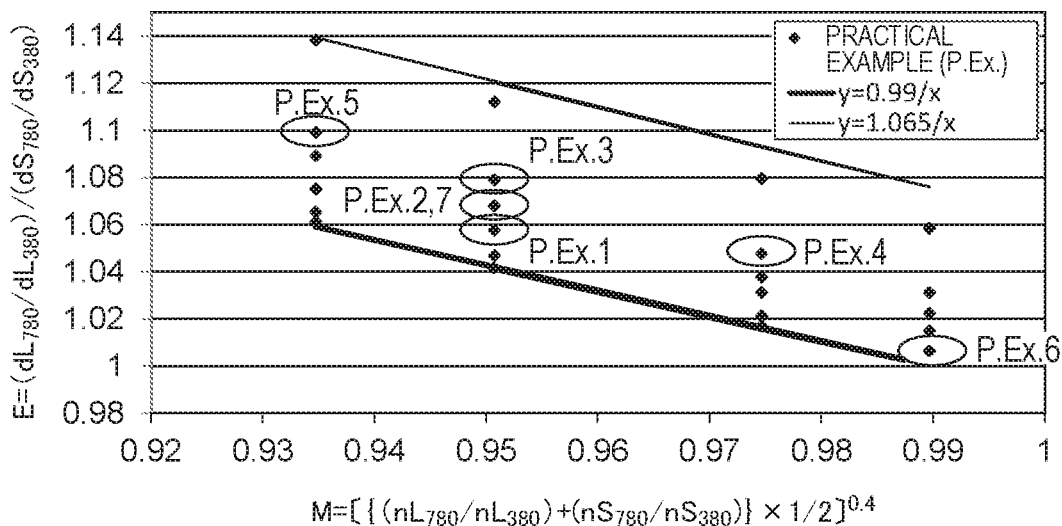
FIG. 27 is an explanatory diagram in which points representing the spectral filters of a plurality of practical examples are plotted on a coordinate plane.

FIG. 27 is a plot, on a coordinate plane where M is taken along the horizontal axis (X axis) and E is taken along the vertical axis (Y axis), of points (coordinates (M, E)) representing the spectral filters of a plurality of practical examples (including Practical Examples 1 to 7). As shown there, by taking as M the average value of the dispersions of the main-refractive-index materials of the LP and the SP raised to the power of 0.4 and plotting its relationship with E, it is possible to see that the points corresponding to a plurality of spectral filters align, on the coordinate plane, along a regression formula (y=a/x) that describes a generally straight line. This makes it easy to identify a regression formula (to determine the value of the constant "a"). In the formula of M, the exponent may be other than 0.4; in that case, however, the points corresponding to a plurality of spectral filters align along a curved line, and this may make it difficult to identify a regression formula.

In FIG. 27, in the range where E is larger than 1, substituting the coordinates (M, E) at the point where E is the largest in the formula y=a/x yields a=1.065. On the other hand, in the range where E is larger than 1, substituting the coordinates (M, E) at the point where E is the smallest in the formula y=a/x yields a=0.99. The points corresponding to the practical examples including Practical Examples 1 to 7 are located in the region defined by the regression formulae y=0.99/x and y=1.065/x. Accordingly, so that E may be larger than 1 and that the half-maximum width ratio $\Delta\lambda$ may fall in the range from 0.3 to 4, a regression formula y=a/x has to be located between y=0.99/x and y=1.065/x; thus, it can be said that the constant "a" in the regression formula needs to be in the range $0.99 \leq a \leq 1.065$.

Since a=x×y=M×E, this conditional formula for "a" can be rewritten as $0.99 \leq M \times E \leq 1.065$.

The formula just above is nothing less than conditional formula (1) noted above. That is, by fulfilling conditional formula (1), it is possible to control the half-maximum width ratio $\Delta\lambda$ in the range from 0.3 to 4, and to obtain a spectral filter in which the half-maximum width is generally uniform over the entire wavelength range of visible light.

Figure 28:
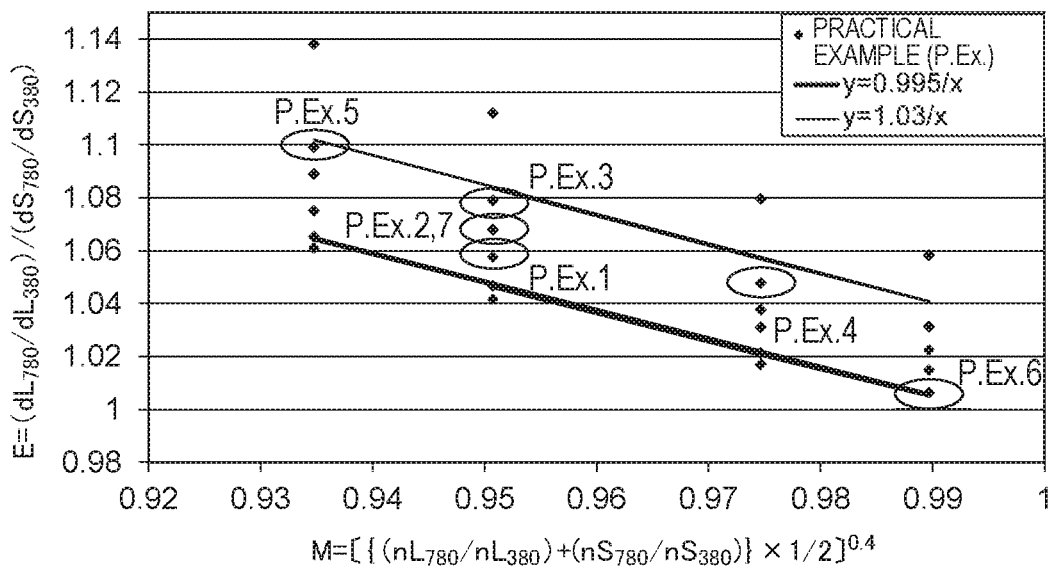
FIG. 28 is an explanatory diagram showing, in FIG. 27, regression formulae that define the region in which Practical Examples 1 to 7 are included.

FIG. 28 shows a case where a regression formula is constructed with focus placed on, among the plurality of practical examples, Practical Examples 1 to 7 in particular. In FIG. 28, the points corresponding to Practical Examples 1 to 7 are located in the region defined by the regression formulae y=0.995/x and y=1.03/x. This means that, so that E may be larger than 1 and that the half-maximum width ratio $\Delta\lambda$ may fall in the range of 0.4 to 2 as in Practical Examples 1 to 7, the regression formula y=a/x has to be located between y=0.995/x and y=1.03/x. That is, the constant "a" in the regression formula has to be in the range $0.995 \leq a \leq 1.03$.

Since a=M×E, this conditional formula can be rewritten as $0.995 \leq M \times E \leq 1.03$.

The formula just above is nothing less than conditional formula (2) noted above. That is, by fulfilling conditional formula (2), it is possible to control the half-maximum width ratio $\Delta\lambda$ in the range from 0.4 to 2, and to obtain a spectral filter in with the half-maximum width is generally uniform over the entire wavelength range of visible light.

Figure 29:
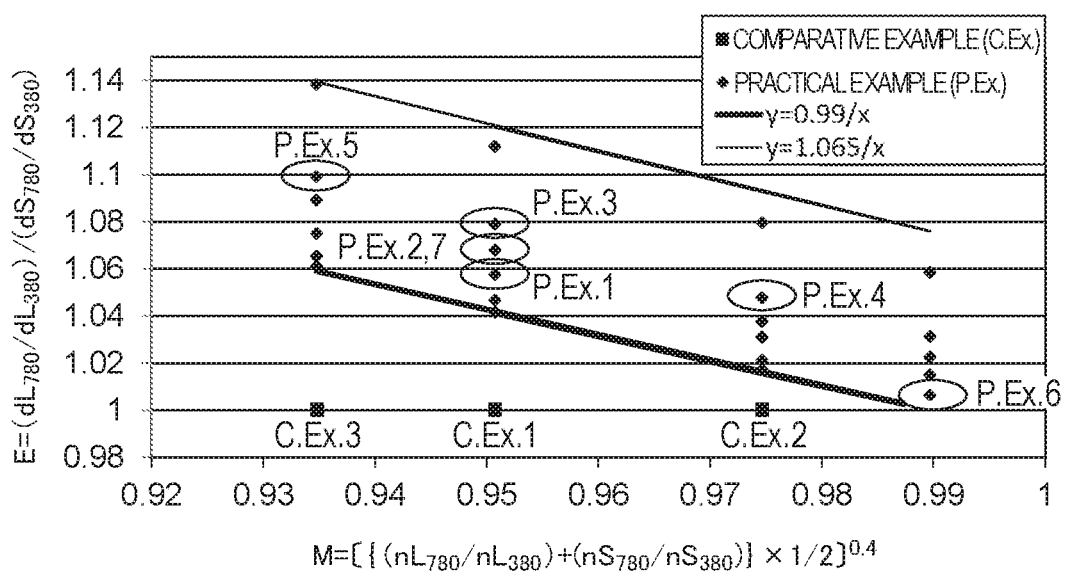
FIG. 29 is an explanatory diagram in which points representing the spectral filters of Comparative Examples 1 to 3 are additionally plotted on the coordinate plane of FIG. 27.

FIG. 29 is a plot of, in addition to the points corresponding to the plurality of practical examples shown in FIG. 27, the points (coordinates (M, E)) representing the spectral filters of Comparative Examples 1 to 3. In the figure, the points corresponding to Comparative Examples 1 to 3 are located at where E=1, outside the region defined by y=0.99/x and y=1.065/x. Thus, in Comparative Examples 1 to 3, it is not possible to control the half-maximum width ratio $\Delta\lambda$ in the range from 0.3 to 4, and it can be said that the half-maximum width exhibits a large variation in the wavelength range of visible light.

The spectral filters and the spectrometric devices according to the embodiment described above can be defined also in the following terms.

According to one aspect of the embodiment, a spectral filter includes: a long-pass filter having a film thickness gradient GL such that the film thickness increases monotonically in one direction, the long-pass filter transmitting light in a wavelength range longer than a cutoff wavelength WL, the cutoff wavelength WL lengthening monotonically as the film thickness increases; and a short-pass filter having a film thickness gradient GS such that the film thickness increases monotonically in one direction, the short-pass filter transmitting light in a wavelength range shorter than a cutoff wavelength WS, the cutoff wavelength WS lengthening monotonically as the film thickness increases. Here, the long-pass filter and the short-pass filter are laid over each other so as to coincide in the one direction in which the film thickness increases monotonically. Moreover, at any position in the one direction, the cutoff wavelength WL is shorter than the cutoff wavelength WS so as to form a peak in transmittance. Moreover, the film thickness gradient GL is larger than the film thickness gradient GS.

Preferably, when the half-maximum width of the transmittance at the wavelength of 380 nm is represented by $\Delta\lambda_{380}$, the half-maximum width of the transmittance at the wavelength of 780 nm is represented by $\Delta\lambda_{780}$ (nm), and $\Delta\lambda_{380}/\Delta\lambda_{780}$ is represented by $\Delta\lambda$, then the spectral filter fulfills $0.3 \leq \Delta\lambda \leq 4$.

Preferably, the long-pass filter and the short-pass filter are each composed of a multi-layer film in which layers of a first-refractive-index material and layers of at least one second-refractive-index material with a refractive index higher than the refractive index of the first-refractive-index material are stacked together. Moreover, preferably, when, among the at least one second-refractive-index material, the material with at least either the largest number of layers or the largest total film thickness is taken as the main-refractive-index material; in the long-pass filter, the refractive indices of the main-refractive-index material at a wavelengths of 380 nm and 780 nm are represented by $nL_{380}$ and $nL_{780}$ respectively, the film thickness of a transmission portion having a peak in transmittance at the wavelength of 780 nm is represented by $dL_{780}$, and the film thickness of a transmission portion having a peak in transmittance at the wavelength of 380 nm is represented by $dL_{380}$; and in the short-pass filter, the refractive indices of the main-refractive-index material at the wavelengths of 380 nm and 780 nm are represented by $nS_{380}$ and $nS_{780}$ respectively, the film thickness of a transmission portion having a peak in transmittance at the wavelength of 780 nm is represented by $dS_{780}$, and the film thickness of a transmission portion having a peak in transmittance at the wavelength of 380 nm is represented by $dS_{380}$, then the spectral filter fulfills conditional formula (1) below:

$$0.99 \leq \{(dL_{780}/dL_{380})/(dS_{780}/dS_{380})\} \times [\{(nL_{780}/nL_{380}) + (nS_{780}/nS_{380})\} \times \tfrac{1}{2}]^{0.4} \leq 1.065 \quad (1)$$

Preferably, when the half-maximum width of the transmittance at the wavelength of 380 nm is represented by $\Delta\lambda_{380}$, the half-maximum width of the transmittance at the wavelength of 780 nm is represented by $\Delta\lambda_{780}$ (nm), and $\Delta\lambda_{380}/\Delta\lambda_{780}$ is represented by $\Delta\lambda$, then the spectral filter fulfills $$0.4 \leq \Delta\lambda \leq 2.$$

Preferably, the long-pass filter and the short-pass filter are each composed of a multi-layer film in which layers of a first-refractive-index material and layers of at least one second-refractive-index material with a refractive index higher than the refractive index of the first-refractive-index material are stacked together. Moreover, preferably, when, among the at least one second-refractive-index material, the material with at least either the largest number of layers or the largest total film thickness is taken as the main-refractive-index material; in the long-pass filter, the refractive indices of the main-refractive-index material at the wavelengths of 380 nm and 780 nm are represented by $nL_{380}$ and $nL_{780}$ respectively, the film thickness of a transmission portion having a peak in transmittance at the wavelength of 780 nm is represented by $dL_{780}$, and the film thickness of a transmission portion having a peak in transmittance at the wavelength of 380 nm is represented by $dL_{380}$; and in the short-pass filter, the refractive indices of the main-refractive-index material at the wavelengths of 380 nm and 780 nm are represented by $nS_{380}$ and $nS_{780}$ respectively, the film thickness of a transmission portion having a peak in transmittance at the wavelength of 780 nm is represented by $dS_{780}$, and the film thickness of a transmission portion having a peak in transmittance at the wavelength of 380 nm is represented by $dS_{380}$, then the spectral filter fulfills conditional formula (2) below:

$$0.995 \leq \{(dL_{780}/dL_{380})/(dS_{780}/dS_{380})\} \times [\{(nL_{780}/nL_{380}) + (nS_{780}/nS_{380})\} \times \tfrac{1}{2}]^{0.4} \leq 1.03 \quad (2)$$

Preferably, the long-pass filter is deposited on one surface of a substrate, and the short-pass filter is deposited on the other surface of the substrate.

According to another aspect of the embodiment, a spectrometric device includes: a spectral filter configured as described above; and a plurality of photoreceptive elements which receive light transmitted through the spectral filter. Here, the photoreceptive elements are arranged along the one direction in which the film thickness increases monotonically in the long-pass and short-pass filters. Although embodiments of the present invention have been described and illustrated in detail, it is clearly understood that the same is by way of illustration and example only and not limitation, the scope of the present invention should be interpreted by terms of the appended claims.

INDUSTRIAL APPLICABILITY

The present invention finds applications in BPs (LVFs) of which the transmission wavelength varies continuously in one direction and in spectrometric devices that incorporate such BPs.

LIST OF REFERENCE SIGNS 1 spectrometric device
10 spectral filter
11 substrate
12 long-pass filter
13 short-pass filter
21 photoreceptive element

The invention claimed is:

1. A spectral filter comprising: a long-pass filter having a film thickness gradient GL such that film thickness increases monotonically in one direction, the long-pass filter transmitting light in a wavelength range longer than a cutoff wavelength WL, the cutoff wavelength WL lengthening monotonically as the film thickness increases; and a short-pass filter having a film thickness gradient GS such that film thickness increases monotonically in one direction, the short-pass filter transmitting light in a wavelength range shorter than a cutoff wavelength WS, the cutoff wavelength WS lengthening monotonically as the film thickness increases, wherein the long-pass filter and the short-pass filter are laid over each other so that the one direction of the long-pass filter is a same direction as the one direction of the short-pass filter, at any position in the one direction, the cutoff wavelength WL is shorter than the cutoff wavelength WS so as to form a peak in transmittance, and the film thickness gradient GL is larger than the film thickness gradient GS, and wherein when a halt-maximum width of the transmittance at a wavelength of 380 nm is represented by $\Delta\lambda_{380}$, a half-maximum width of the transmittance at a wavelength of 780 nm is represented by $\Delta\lambda_{780}$ (nm), and $\Delta\lambda_{380}/\Delta\lambda_{780}$ is represented by $\Delta\lambda$, then the spectral filter fulfills $0.3 \leq \Delta\lambda \leq 4$.

2. The spectral filter according to claim 1, wherein the long-pass filter and the short-pass filter are each composed of a multi-layer film in which layers of a first-refractive-index material and layers of at least one second-refractive-index material with a refractive index higher than a refractive index of the first-refractive-index material are stacked together, and when, among the at least one second-refractive-index material, a material with at least either a largest number of layers or a largest total film thickness is taken as a main-refractive-index material, in the long-pass filter, refractive indices of the main-refractive-index material at the wavelengths of 380 nm and 780 nm are represented by $nL_{380}$ and $nL_{780}$ respectively, a film thickness of a transmission portion having a peak in transmittance at the wavelength of 780 nm is represented by $dL_{780}$, and a film thickness of a transmission portion having a peak in transmittance at the wavelength of 380 nm is represented by $dL_{380}$, and in the short-pass filter, refractive indices of the main-refractive-index material at the wavelengths of 380 nm and 780 nm are represented by $nS_{380}$ and $nS_{780}$ respectively, a film thickness of a transmission portion having a peak in transmittance at the wavelength of 780 nm is represented by $dS_{780}$, and a film thickness of a transmission portion having a peak in transmittance at the wavelength of 380 nm is represented by $dS_{380}$, then the spectral filter fulfills conditional formula below:

$$0.99 \leq \{(dL_{780}/dL_{380})/(dS_{780}/dS_{380})\} \times [\{(nL_{780}/nL_{380}) + (nS_{780}/nS_{380})\} \times \tfrac{1}{2}]^{0.4} \leq 1.065 \quad (1).$$

3. The spectral filter according to claim 1, wherein the spectral filter fulfills $0.4 \leq \Delta\lambda \leq 2$.

4. The spectral filter according to claim 3, wherein the long-pass filter and the short-pass filter are each composed of a multi-layer film in which layers of a first-refractive-index material and layers of at least one second-refractive-index material with a refractive index higher than a refractive index of the first-refractive-index material are stacked together, and when, among the at least one second-refractive-index material, a material with at least either a largest number of layers or a largest total film thickness is taken as a main-refractive-index material, in the long-pass filter, refractive indices of the main-refractive-index material at the wavelengths of 380 nm and 780 nm are represented by $nL_{380}$ and $nL_{780}$, respectively, a film thickness of a transmission portion having a peak in transmittance at the wavelength of 780 nm is represented by $dL_{780}$, and a film thickness of a transmission portion having a peak in transmittance at the wavelength of 380 nm is represented by $dL_{380}$, and in the short-pass filter, refractive indices of the main-refractive-index material at the wavelengths of 380 nm and 780 nm are represented by $nS_{380}$ and $nS_{780}$ respectively, a film thickness of a transmission portion having a peak in transmittance at the wavelength of 780 nm is represented by $dS_{780}$, and a film thickness of a transmission portion having a peak in transmittance at the wavelength of 380 nm is represented by $dS_{380}$, then the spectral filter fulfills conditional formula (2) below:

$$0.995 \leq \{(dL_{780}/dL_{380})/(dS_{780}/dS_{380})\} \times [\{(nL_{780}/nL_{380}) + (nS_{780}/nS_{380})\} \times \tfrac{1}{2}]^{0.4} \leq 1.03 \quad (2).$$

5. The spectral filter according to claim 1, wherein
the long-pass filter is deposited on one surface of a substrate, and
the short-pass filter is deposited on another surface of the substrate.

6. The spectral filter according to claim 5, wherein an angle between the one surface of the substrate and an outermost surface of the long-pass filter is represented by $\alpha$ and an angle between the another surface of the substrate and an outermost surface of the short-pass filter is represented by $\beta$, and wherein the film thickness gradient GL equals $|\tan \alpha|$ and the film thickness gradient GS equals $|\tan \beta|$.

7. A spectrometric device comprising:
the spectral filter according to claim 1; and
a plurality of photoreceptive elements which receive light transmitted through the spectral filter,
wherein the photoreceptive elements are arranged along the one direction in which the film thickness increases monotonically in the long-pass and short-pass filters of the spectral filter.

8. The spectral filter according to claim 1, wherein the long-pass filter and the short-pass filter are each composed of a multi-layer film in which layers of a first-refractive-index material and layers of at least one second-refractive-index material with a refractive index higher than a refractive index of the first-refractive-index material are stacked together.

* * * * *